(12) United States Patent
Grigoreva et al.

(10) Patent No.: US 10,909,112 B2
(45) Date of Patent: *Feb. 2, 2021

(54) METHOD OF AND A SYSTEM FOR DETERMINING LINKED OBJECTS

(71) Applicant: YANDEX EUROPE AG, Lucerne (CH)

(72) Inventors: Svetlana Alexandrovna Grigoreva, Moscow (RU); Mikhail Jurievich Kosarev, Moscow region (RU); Vladimir Aleksandrovich Konovodov, Kaluga region (RU); Alexey Viktorovich Sokirko, Moscow (RU)

(73) Assignee: YANDEX EUROPE AG, Lucerne (CH)

( * ) Notice: Subject to any disclaimer, the term of this patent is extended or adjusted under 35 U.S.C. 154(b) by 305 days.

This patent is subject to a terminal disclaimer.

(21) Appl. No.: 15/106,943

(22) PCT Filed: Dec. 24, 2014

(86) PCT No.: PCT/IB2014/067298
§ 371 (c)(1),
(2) Date: Jun. 21, 2016

(87) PCT Pub. No.: WO2015/198115
PCT Pub. Date: Dec. 30, 2015

(65) Prior Publication Data
US 2016/0335314 A1    Nov. 17, 2016

(30) Foreign Application Priority Data

Jun. 24, 2014  (RU) .................... 2014125471

(51) Int. Cl.
*G06F 16/00* (2019.01)
*G06F 16/242* (2019.01)
(Continued)

(52) U.S. Cl.
CPC ........ *G06F 16/2425* (2019.01); *G06F 16/248* (2019.01); *G06F 16/951* (2019.01)

(58) Field of Classification Search
CPC ......... G06F 17/30882; G06F 17/30887; G06F 15/173; G06F 17/30115; G06F 17/30477;
(Continued)

(56) References Cited

U.S. PATENT DOCUMENTS 7,225,407 B2  5/2007 Sommerer et al.
7,346,613 B2  3/2008 Hurst-Hiller et al.
(Continued)

FOREIGN PATENT DOCUMENTS

CA   2494388 A1   1/2005
CN   1648902 A    8/2005
(Continued)

OTHER PUBLICATIONS

English abstract from RU 2009145272 retrieved from Espacenet on Jan. 11, 2017.

(Continued)

*Primary Examiner* — Augustine K. Obisesan
(74) *Attorney, Agent, or Firm* — BCF LLP

(57) ABSTRACT

A method of processing a search query from a user associated with an electronic device and generating a search result set responsive to the search query. The method is executable at a search server coupled to the electronic device via a communication network, the method comprising: receiving from the electronic device, via the communication network, the search query; determining a search object associated with the search query; generating an object component for inclusion into a search engine results page; generating a linked object component associated with the search object by executing: determining a first object domain associated with the search object and a second object domain associ-
(Continued)

ated with the search object; determining a first linked object from the first object domain and a second linked object from the second object domain, the first linked object and the second linked objects being semantically linked to the search object.

18 Claims, 12 Drawing Sheets

(51) Int. Cl.
  *G06F 16/248* (2019.01)
  *G06F 16/951* (2019.01)
(58) Field of Classification Search
  CPC ......... G06F 17/30657; G06F 17/30864; Y10S 707/99931; G06Q 50/01; H04L 63/123; H04L 45/04; H04L 61/3025
  See application file for complete search history.

(56) References Cited

U.S. PATENT DOCUMENTS

| | | | |
|---|---|---|---|
| 7,353,246 | B1 | 4/2008 | Rosen et al. |
| 7,415,460 | B1 | 8/2008 | Phillips et al. |
| 7,529,835 | B1 | 5/2009 | Agronow et al. |
| 7,805,441 | B2 | 9/2010 | Madhavan et al. |
| 7,917,528 | B1 | 3/2011 | Dave et al. |
| 7,974,976 | B2 | 7/2011 | Yahia et al. |
| 8,117,197 | B1 | 2/2012 | Cramer et al. |
| 8,131,718 | B2 | 3/2012 | Tran |
| 8,196,045 | B2 | 6/2012 | Chandratillake et al. |
| 8,244,757 | B2 | 8/2012 | Karlson et al. |
| 8,260,664 | B2 | 9/2012 | Vadlamani et al. |
| 8,352,465 | B1 | 1/2013 | Jing et al. |
| 8,364,669 | B1 | 1/2013 | Chowdhury et al. |
| 8,443,003 | B2 | 5/2013 | O'Donnell et al. |
| 8,543,584 | B2 | 9/2013 | Vandon et al. |
| 8,577,913 | B1 | 11/2013 | Hannson et al. |
| 8,751,520 | B1 | 6/2014 | Bhattacharjee et al. |
| 8,751,530 | B1 | 6/2014 | Ioffe et al. |
| 8,819,000 | B1 | 8/2014 | Acharya et al. |
| 8,949,250 | B1 | 2/2015 | Garg et al. |
| 9,384,216 | B2 | 7/2016 | Ramos et al. |
| 9,418,114 | B1 | 8/2016 | Mengle et al. |
| 2002/0198875 | A1 | 12/2002 | Masters et al. |
| 2005/0144158 | A1 | 6/2005 | Capper et al. |
| 2005/0278321 | A1* | 12/2005 | Vailaya ............. G06F 17/30864 |
| 2006/0031214 | A1 | 2/2006 | Solaro et al. |
| 2006/0129915 | A1 | 6/2006 | Chan et al. |
| 2006/0224951 | A1 | 10/2006 | Burke et al. |
| 2006/0287985 | A1 | 12/2006 | Castro et al. |
| 2007/0112738 | A1 | 5/2007 | Livaditis et al. |
| 2007/0198503 | A1 | 8/2007 | Hogue et al. |
| 2007/0198593 | A1 | 8/2007 | Prahlad et al. |
| 2008/0022229 | A1 | 1/2008 | Bhumkar et al. |
| 2008/0109426 | A1 | 5/2008 | Constantinides et al. |
| 2008/0177735 | A1 | 7/2008 | Garbow et al. |
| 2008/0215563 | A1 | 9/2008 | Shi et al. |
| 2009/0024962 | A1 | 1/2009 | Gotz |
| 2009/0100357 | A1 | 4/2009 | Signorini et al. |
| 2009/0112861 | A1 | 4/2009 | Saugen et al. |
| 2009/0119268 | A1* | 5/2009 | Bandaru ............. G06F 17/2745 705/7.12 |
| 2009/0327268 | A1 | 12/2009 | Denney et al. |
| 2010/0070486 | A1* | 3/2010 | Punaganti Venkata ................. G06F 16/248 707/722 |
| 2010/0106701 | A1 | 4/2010 | Ducatel et al. |
| 2010/0114873 | A1 | 5/2010 | Gupta et al. |
| 2010/0114908 | A1 | 5/2010 | Chand et al. |
| 2010/0121714 | A1 | 5/2010 | Bovenschulte et al. |
| 2010/0131563 | A1* | 5/2010 | Yin ....................... G06F 16/338 707/794 |
| 2010/0241663 | A1 | 9/2010 | Huang et al. |
| 2010/0250529 | A1* | 9/2010 | Surendran ............. G06Q 30/02 707/732 |
| 2010/0281012 | A1 | 11/2010 | Imig et al. |
| 2011/0055191 | A1 | 3/2011 | Bain et al. |
| 2011/0060752 | A1 | 3/2011 | Lane et al. |
| 2011/0264673 | A1 | 10/2011 | White et al. |
| 2011/0276560 | A1 | 11/2011 | Costello |
| 2012/0054166 | A1 | 3/2012 | Jeremias |
| 2012/0059838 | A1* | 3/2012 | Berntson ............... G06F 16/951 707/759 |
| 2012/0066275 | A1 | 3/2012 | Gerstner et al. |
| 2012/0109941 | A1 | 5/2012 | Cohen et al. |
| 2012/0124026 | A1 | 5/2012 | Grois et al. |
| 2012/0203734 | A1 | 8/2012 | Spivack et al. |
| 2012/0231770 | A1 | 9/2012 | Clarke et al. |
| 2012/0278300 | A1 | 11/2012 | Soubbotin et al. |
| 2012/0278316 | A1 | 11/2012 | Reznik et al. |
| 2012/0311491 | A1 | 12/2012 | Melton et al. |
| 2013/0006914 | A1 | 1/2013 | Ray et al. |
| 2013/0036131 | A1* | 2/2013 | Antic ..................... G06F 16/148 707/769 |
| 2013/0060746 | A1 | 3/2013 | Hogue et al. |
| 2013/0080247 | A1 | 3/2013 | Parsana et al. |
| 2013/0110804 | A1 | 5/2013 | Davis et al. |
| 2013/0125047 | A1 | 5/2013 | Levin et al. |
| 2013/0166563 | A1 | 6/2013 | Mueller et al. |
| 2013/0191376 | A1 | 7/2013 | Zhiyanov et al. |
| 2013/0262444 | A1* | 10/2013 | Leslie ................. G06F 16/9038 707/722 |
| 2013/0268504 | A1 | 10/2013 | Liao et al. |
| 2013/0268517 | A1 | 10/2013 | Madhavan et al. |
| 2013/0275422 | A1 | 10/2013 | Silber et al. |
| 2013/0282683 | A1* | 10/2013 | Kohavi ................. G06F 16/954 707/706 |
| 2013/0332438 | A1 | 12/2013 | Li et al. |
| 2014/0136536 | A1 | 5/2014 | Ramsey et al. |
| 2014/0149390 | A1 | 5/2014 | Chen et al. |
| 2014/0280119 | A1 | 9/2014 | Ganesh et al. |
| 2014/0358910 | A1 | 12/2014 | Frigon et al. |
| 2015/0039473 | A1 | 2/2015 | Hu et al. |
| 2015/0227633 | A1* | 8/2015 | Shapira ................. G06F 16/338 707/706 |
| 2015/0278355 | A1 | 10/2015 | Hassanpour et al. |
| 2015/0317354 | A1* | 11/2015 | Andress ............... G06F 16/248 707/706 |
| 2015/0317945 | A1* | 11/2015 | Andress ............... G06T 11/001 345/590 |
| 2015/0348107 | A1 | 12/2015 | Wu et al. |
| 2016/0210289 | A1* | 7/2016 | Esinovskaya ..... G06F 16/24565 |

FOREIGN PATENT DOCUMENTS

| | | |
|---|---|---|
| EP | 1557773 A2 | 7/2005 |
| RU | 2335013 C2 | 9/2008 |
| RU | 2009145272 A | 6/2011 |
| WO | 2002061610 A1 | 8/2002 |
| WO | 2004097569 A2 | 11/2004 |
| WO | 2008117045 A1 | 10/2008 |
| WO | 2013090946 A1 | 6/2013 |

OTHER PUBLICATIONS

English abstract from CN 1648902 retrieved from Espacenet on Jan. 11, 2017.
U.S. Appl. No. 15/188,479, filed Jun. 21, 2016.
U.S. Appl. No. 15/106,956, filed Jun. 21, 2016.
U.S. Appl. No. 15/106,943, filed Jun. 21, 2016.
U.S. Appl. No. 15/106,927, filed Jun. 21, 2016.
U.S. Appl. No. 15/106,931, filed Jun. 21, 2016.

* cited by examiner

METHOD OF AND A SYSTEM FOR DETERMINING LINKED OBJECTS

CROSS-REFERENCE

The present application claims convention priority to Russian Patent Application No. 2014125471, filed Jun. 24, 2014, entitled "A METHOD OF AND A SYSTEM FOR DETERMINING LINKED OBJECTS" which is incorporated by reference herein in its entirety.

FIELD

The present technology relates to search engines in general and specifically to a method of and a system for processing search queries and generating a search result page.

BACKGROUND

Various global or local communications networks (the Internet, the World Wide Web, local area networks and the like) offer a user a vast amount of information. The information includes a multitude of contextual topics, such as but not limited to, news and current affairs, maps, company information, financial information and resources, traffic information, games and entertainment related information. Users use a variety of client devices (desktop, laptop, notebook, smartphone, tablets and the like) to have access to rich content (like images, audio, video, animation, and other multimedia content from such networks).

Generally speaking, a given user can access a resource on the communications network by two principle means. The given user can access a particular resource directly, either by typing an address of the resource (typically an URL or Universal Resource Locator, such as www.webpage.com) or by clicking a link in an e-mail or in another web resource. Alternatively, the given user may conduct a search using a search engine to locate a resource of interest. The latter is particularly suitable in those circumstances, where the given user knows a topic of interest, but does not know the exact address of the resource she is interested in.

There are numerous search engines available to the user. Some of them are considered to be general purpose search engines (such as Yandex™, Google™, Yahoo™ and the like). Others are considered to be vertical search engines—i.e. search engines dedicated to a particular topic of search—such as Momondo™ search engine dedicated to searching flights.

Irrespective of which search engine is used, the search engine is generally configured to receive a search query from a user, to perform a search and to return a ranked search results page (SERP) to the user. A typical SERP sometimes includes additional information, such as special placement results, banner ads, text ads and the like.

Several attempts have been made to improve the design of the SERP in the strive to enable the user to more easily and faster appreciate search results. Some of the commercially available search engines also strived to make the user experience on the SERP as productive as possible by attempting to provide at least a partial answer the user query directly on the SERP. The theory behind this initiative is to treat user experience on the search engine page or the SERP as the user solving a particular user-problem by attempting to access particular information. The fewer the "clicks" the user has to make to get to the information, the better the user experience is likely to be. In the extreme example, if a given user were to get the answer to her questions or obtain information required to solve her problem directly on the SERP, it is likely that the given user would consider the user experience with the SERP and the search engine in general as a positive one.

There are several examples, within the prior art search engine of various attempts to improve the user experience on the SERP.

For example, a given user uses the Google™ search engine to search for exchange rates. The user may have entered a search query "Exchange rate 1 Canadian Dollar to US Dollar". The user is presented with a SERP a screen shot of which is depicted in FIG. 1 as a screen shot 100, the SERP depicted at the screen shot 100 being implemented in accordance with known techniques.

Within the screen shot 100, the user is presented with several conventionally-known fields. Amongst these fields are: a query interface 102 and a search results interface 104. The general purpose of the query interface 102 is to enable the user (not depicted) to enter her query or a "search string" (which in this case is "Exchange rate 1 Canadian Dollar to US Dollar"). The general purpose of the search results interface 104 is to provide search results that are responsive to the user query entered into the query interface 102.

Within the search results interface 104 there is shown a SERP 106, the SERP 106 having several components. Within the SERP 106, there is provided an advertising portion 108 containing one or more sponsored or paid-for messages, a general search result portion 110 (containing general search results) and a widget portion 112. Within the widget portion 112, the user is able to undertake several interactive actions. For example, the user is able to change the amount and/or the currencies involved in the exchange rate calculations. Responsive to the user changes, the widget portion 112 provides the appropriate answer. Now, it should be noted that the widget portion 112 is associated with a vertical service of Google—in other words, it was specifically built for the Google currency exchange vertical service.

In another example, let it be assumed that the user has typed in a query (using the query interface 102 of the Google search engine), the query containing: "Cheap flights Toronto to Moscow". The user is presented with a SERP a screen shot of which is represented in FIG. 2 as a screen shot 200. Within the screen shot 200, the user is presented with several conventionally-known fields. Amongst these fields are: the query interface 102 and a search results interface 104. Within the search results interface 104 there is shown a SERP 206, the SERP 206 having several components. Within the SERP 206, there is provided an advertising portion 208 containing one or more sponsored or paid-for messages, a general search result portion 210 (containing general search results) and a widget portion 212. Within the widget portion 212, the user is able to undertake several interactive actions. For example, the user is able to change the departure date and/or the return date for the flights sought.

Responsive to the user changes, the widget portion 212 will provide the appropriate output, including available airlines, flight duration and approximate price indication.

In certain circumstances the given user may be looking for information about what can be categorized as an "object" and such a search can be categorized as an "object-related search". For example, the user may be looking for "bridges of Spain", the bridges of Spain being an object within the sense of the search. By the same token, the user may be looking for "Madonna, the entertainer", Madonna being an object within the sense of the search.

As an example of such an object search, let it be assumed that the user has typed in a query (using the query interface 102 of the Google search engine), the query containing: "Madonna". The user is presented with a SERP a screen shot of which is represented in FIG. 3 as a screen shot 300. Within the screen shot 300, the user is presented with several conventionally-known fields. Amongst these fields are: the query interface 102 and the search results interface 104. Within the search results interface 104 there is shown a SERP 306, the SERP 306 having several components. Within the SERP 306, there is provided a general search result portion 310 (containing general and/or vertical search results) and an object card portion 312. The general search portion 310 provides a list of web resources that are responsive to the search query "Madonna". These web resources include a snippet of information from the News vertical about Madonna, a Wikipedia page about Madonna, a Madonna profile page on Instagram™, a Madonna page on Facebook™ and the like. Typically, the general search result portion 310 includes several pages of ranked search results, with the most relevant search results being located at the top of the SERP 306 with the remainder of the search results organized in a decreased relevancy listing on one or more scrollable pages.

The object card portion 312 comprises a snapshot of information about the "search object" associated with the search query, in this case, the "search object" being Madonna. The typical object card portion 312 (in this case being associated with Madonna, the singer) includes an image snapshot 314, a social media snapshot 316, an object information snapshot 318, an audio snapshot 320, a recent posts snapshot 322 and a linked objects carousel 324. There are different ways for how the information for the object card portion 312 can be populated.

For example, the image snapshot 312 can be generated based on information available within the images search vertical associated with the search engine responsible for generating the SERP 306.

The social media snapshot 316 can be generated from a social media resource associated with the search engine responsible for generating the SERP 306. Since in the illustrated example, the search engine is GOOGLE™ search engine, the social media snapshot 316 can be generated from the GOOGLE+™ social media resource.

The object information snapshot 318 can be generated from either an internal repository of the search engine responsible for generating the SERP 306 or from a third-party source. For example, the object information snapshot 318 can be generated based on the object information contained on the WIKIPEDIA™ resource.

The audio snapshot 320 can be generated from a music vertical associated with the search engine responsible for generating the SERP 306. The recent posts snapshot 322 can be generated from a blog service associated with the search engine responsible for generating the SERP 306 or from a third party blog service.

Last but not least, the linked objects carousel 324 includes an indication one or more "objects" associated with the "object" for which the object card portion 312 was generated. Within the illustrated prior art example, the linked object carousel 324 includes an indication of the following "objects": Lady Gaga, Britney Spears, Michael Jackson, Kyle Minogue and Guy Ritchie (former partner).

SUMMARY

It is an object of the present technology to ameliorate at least some of the inconveniences present in the prior art.

Inventors have developed embodiments of the present technology based on their appreciation of at least one problem associated with the prior art. For example, even though the prior art solution presented with reference to the FIG. 3 example has merits and assists with presenting an answer to the search query directly on the SERP 306, it still presents certain shortcomings. For example, if the user were to search for "Lady Gaga" being a different "search object" from the same search domain as "Madonna", the user would be presented with a very similar object card portion 312, albeit with information about Madonna being substituted with information about Lady Gaga. Within this example—both Madonna and Lady Gaga can be said to be "search objects" from the same "search object domain"—popular singers. As such, within this scenario, it is acceptable that the two "search objects" share the same format of the object card portion 312—as the two objects are related to the same search object domain.

However, it is possible that a single "search object" may belong to several object domains. Continuing with the above example of Madonna, Madonna can be considered to be part of several search object domains—"singer", "actress", "children book writer" and the like. As such, any given user, when performing a search for "Madonna" (as depicted in FIG. 3), may have one or more search intents associated with one or more of the search object domains associated with the searched object.

For example, if the given user was looking for Madonna as an actress, the user will not be satisfied with the information presented to her within the object card portion 312 as depicted in FIG. 3. The user will be left browsing the general search result portion 310 and looking for one or more links to the web resources associated with the Madonna as an actress. From that perspective, the object card portion 312 would essentially fail to fulfil its purpose of presenting information to the user, the information being responsive to the search query.

According to a first broad aspect of the present technology, there is provided a method of processing a search query from a user associated with an electronic device and generating a search engine result page (SERP) responsive to the search query. The method is executable at a search server coupled to the electronic device via a communication network. The method comprises: determining a user-search-intent, based at least in part on the search query; determining a first object component associated with the search query; determining a second object component associated with the search query; based on the user-search-intent, determining an order associated with the first object component and the second object component; compiling an object card containing the first object component and the second object component in the determined order.

In some embodiments of the method, the compiling further includes providing an object badge, the object badge being located above the first object component and the second object component.

In some embodiments of the method, the determining the user-search-intent based at least in part on the search query comprises determining the user-search-intent based on the search query and at least one search result, other than the first object component and the second object component, the at least one search result also being responsive to the search query.

In some embodiments of the method, the determining the user-search-intent based at least in part on the search query comprises determining the user-search-intent based on the search query and a heading associated with one of the first object component and the second object component.

In some embodiments of the method, the determining the user-search-intent based at least in part on the search query comprises determining the user-search-intent based on the search query and past SERP interactions between other users and SERPs that were generated in response to past queries similar to the search query.

In some embodiments of the method, the method further comprises determining if the search query is susceptible of being answered by object information and wherein the determining a first object component associated with the search query and the determining a second object component associated with the search query is executed in response to the determining if the search query is susceptible of being answered by object information rendering a positive outcome.

In some embodiments of the method, the determining a first object component associated with the search query comprises generating the first object component based on a vertical search result.

In some embodiments of the method, the determining a second object component associated with the search query comprises generating the second object component based on a vertical search result.

In some embodiments of the method, the determining a first object component associated with the search query comprises generating the first object component based on a first vertical search result and the determining a second object component associated with the search query comprises generating the second object component based on a second vertical search result.

According to another broad aspect of the present technology, there is provided a method of processing a search query from a user associated with an electronic device and generating a search result set responsive to the search query. The method is executable at a search server coupled to the electronic device via a communication network. The method comprises: determining a user-search-intent, based at least in part on the search query; determining a first object component associated with the search query; determining a second object component associated with the search query; responsive to the user-search-intent being of a first type, including one of the first object component and the second object component in an object card; responsive to the user-search-intent being of a second type, including the other one of the first object component and the second object component in the object card.

In some embodiments of the method, the compiling further includes providing an object badge, the object badge being located above the first object component and the second object component.

In some embodiments of the method, the determining the user-search-intent based at least in part on the search query comprises determining the user-search-intent based on the search query and at least one search result, other than the first object component and the second object component, the at least one search result also being responsive to the search query.

In some embodiments of the method, the determining the user-search-intent based at least in part on the search query comprises determining the user-search-intent based on the search query and a heading associated with one of the first object component and the second object component.

In some embodiments of the method, the determining the user-search-intent based at least in part on the search query comprises determining the user-search-intent based on the search query and past SERP interactions between other users and SERPs that were generated in response to past queries similar to the search query.

In some embodiments of the method, the method further comprises determining if the search query is susceptible of being answered by object information and wherein the determining a first object component associated with the search query and the determining a second object component associated with the search query is executed in response to the determining if the search query is susceptible of being answered by object information rendering a positive outcome.

In some embodiments of the method, the determining a first object component associated with the search query comprises generating the first object component based on a vertical search result.

In some embodiments of the method, the determining a second object component associated with the search query comprises generating the second object component based on a vertical search result.

In some embodiments of the method, the determining a first object component associated with the search query comprises generating the first object component based on a first vertical search result and the determining a second object component associated with the search query comprises generating the second object component based on a second vertical search result.

According to another broad aspect of the present technology, there is provided a server. The server comprises: a communication interface for communication with an electronic device via a communication network, a processor operationally connected with the communication interface, the processor configured to: receive a search query from a user associated with the electronic device; determine a user-search-intent, based at least in part on the search query; determine a first object component associated with the search query; determine a second object component associated with the search query; based on the user-search-intent, determine an order associated with the first object component and the second object component; compile an object card containing the first object component and the second object component in the determined order; generate a search engine result page (SERP) responsive to the search query, the SERP including the object card; transmit a trigger to the electronic device to cause the electronic device to display the SERP.

In some embodiments of the server, to compile, the processor is operable to provide an object badge, the object badge being located above the first object component and the second object component.

In some embodiments of the server, to determine the user-search-intent based at least in part on the search query, the processor is configured to determine the user-search-intent based on the search query and at least one search result, other than the first object component and the second object component, the at least one search result also being responsive to the search query.

In some embodiments of the server, to determine the user-search-intent based at least in part on the search query, the processor is configured to determine the user-search-intent based on the search query and a heading associated with one of the first object component and the second object component.

In some embodiments of the server, to determine the user-search-intent based at least in part on the search query, the processor is configured to determine the user-search-intent based on the search query and past SERP interactions between other users and SERPs that were generated in response to past queries similar to the search query.

In some embodiments of the server, the processor is being further configured to determine if the search query is susceptible of being answered by object information and wherein the processor determines the first object component associated with the search query and the second object component associated with the search query only in response to the determining if the search query is susceptible of being answered by object information rendering a positive outcome.

In some embodiments of the server, to determine a first object component associated with the search query, the processor is configured to generate the first object component based on a vertical search result.

In some embodiments of the server, to determine a second object component associated with the search query, the processor is configured to generate the second object component based on a vertical search result.

In some embodiments of the server, to determine a first object component associated with the search query, the processor is configured to generate the first object component based on a first vertical search result and to determine a second object component associated with the search query, the processor is configured to generate the second object component based on a second vertical search result.

According to another broad aspect of the present technology, there is provided a server. The server comprises: a communication interface for communication with an electronic device via a communication network, a processor operationally connected with the communication interface, the processor configured to: receive a search query from a user associated with the electronic device; determine a user-search-intent, based at least in part on the search query; determine a user-search-intent, based at least in part on the search query; determine a first object component associated with the search query; determine a second object component associated with the search query; responsive to the user-search-intent being of a first type, include one of the first object component and the second object component in an object card; responsive to the user-search-intent being of a second type, include the other one of the first object component and the second object component in the object card; generate a search engine result page (SERP) responsive to the search query, the SERP including the a respective one of the first object component and the second object component; transmit a trigger to the electronic device to cause the electronic device to display the SERP.

In some embodiments of the server, to compile, the processor is configured to provide an object badge, the object badge being located above the first object component and the second object component.

In some embodiments of the server, to determine the user-search-intent based at least in part on the search query, the processor is configured to determine the user-search-intent based on the search query and at least one search result, other than the first object component and the second object component, the at least one search result also being responsive to the search query.

In some embodiments of the server, to determine the user-search-intent based at least in part on the search query, the processor is configured to determine the user-search-intent based on the search query and a heading associated with one of the first object component and the second object component.

In some embodiments of the server, to determine the user-search-intent based at least in part on the search query, the processor is configured to determine the user-search-intent based on the search query and past SERP interactions between other users and SERPs that were generated in response to past queries similar to the search query.

In some embodiments of the server, the processor is further configured to determine if the search query is susceptible of being answered by object information and wherein the determining a first object component associated with the search query and the determining a second object component associated with the search query is executed in response to the determining if the search query is susceptible of being answered by object information rendering a positive outcome.

In some embodiments of the server, to determine a first object component associated with the search query, the processor is configured to generate the first object component based on a vertical search result.

In some embodiments of the server, to determine a second object component associated with the search query, the processor is configured to generate the second object component based on a vertical search result.

In some embodiments of the server, to determine a first object component associated with the search query, the processor is configured to generate the first object component based on a first vertical search result and to determine a second object component associated with the search query, the processor is configured to generate the second object component based on a second vertical search result.

According to another broad aspect of the present technology, there is provided a method of processing a search query from a user associated with an electronic device and generating a search result set responsive to the search query. The method is executable at a search server coupled to the electronic device via a communication network. The method comprising: receiving from the electronic device, via the communication network, the search query; based on the search query, determining a search results set; determining a search object component associated with the search query; determining a best-matching search result from the search results set associated with the search object component; augmenting the search object component with a link to the best-matching search result, such that to generate an augmented search object component including the link; compiling a search engine results page including the augmented search object component; causing the electronic device to display the search engine results page.

In some embodiments of the method, the determining a search object component associated with the search query comprises organizing the search object component based on at least one vertical search.

In some embodiments of the method, the determining the best-matching search result comprises retrieving the top-matching result from a general web search.

In some embodiments of the method, the augmenting is executed in response to the user providing a positive indication to augment the search engine results page with the best-matching search result.

In some embodiments of the method, the causing the electronic device to display the search engine results page comprises: displaying an un-augmented version of the search engine results page including the search object component; responsive to the user providing the positive indication to augment, displaying an augmented version of the search engine results page including the augmented search object component.

In some embodiments of the method, the link to the best-matching search result comprises a first link to a first-best matched search result and a second link to a second-best matched search result.

In some embodiments of the method, the first-best matched search result and the second-best matched result are determined based on a ranked general web search results.

In some embodiments of the method, the compiling a search engine results page including the augmented search object component further comprises adding an object badge to the augmented search object component.

In some embodiments of the method, the search object component being a first search object component, the best-matching result being a first best-matching result and the augmented search object is a first augmented search object, the method further comprising: determining a second search object component associated with the search query; determining a second best-matching search result from the search results set associated with the second search object component; augmenting the second search object component with a link to the second best-matching search result, such that to generate a second augmented search object component including the link; and wherein the compiling the search engine results page comprises including the first augmented search object component and the second augmented search object component.

In some embodiments of the method, the first search object component is based on a first vertical search result and the second search object component is based on a second vertical search result.

According to another broad aspect of the present technology, there is provided a server. The server comprises: a communication interface for communication with an electronic device via a communication network, a processor operationally connected with the communication interface, the processor configured to: receive, over the communication network, a search query from a user associated with an electronic device; based on the search query, determine a search results set; determine a search object component associated with the search query; determine a best-matching search result from the search results set associated with the search object component; augment the search object component with a link to the best-matching search result, such that to generate an augmented search object component including the link; compile a search engine results page including the augmented search object component; cause the electronic device to display the search engine results page.

In some embodiments of the server, to determine a search object component associated with the search query, the processor is configured to organize the search object component based on at least one vertical search.

In some embodiments of the server, to determine the best-matching search result, the processor is configured to retrieve the top-matching result from a general web search.

In some embodiments of the server, the processor augments the search object component in response to the user providing a positive indication to augment the search engine results page with the best-matching search result.

In some embodiments of the server, to cause the electronic device to display the search engine results page, the processor is configured to cause the electronic device to: display an un-augmented version of the search engine results page including the search object component; responsive to the user providing the positive indication to augment, display an augmented version of the search engine results page including the augmented search object component.

In some embodiments of the server, the link to the best-matching search result comprises a first link to a first-best matched search result and a second link to a second-best matched search result.

In some embodiments of the server, the first-best matched search result and the second-best matched result are determined based on a ranked general web search results.

In some embodiments of the server, to compile a search engine results page including the augmented search object component, the processor is further configured to add an object badge to the augmented search object component.

In some embodiments of the server, the search object component being a first search object component, the best-matching result being a first best-matching result and the augmented search object is a first augmented search object, the processor being further configured to: determine a second search object component associated with the search query; determine a second best-matching search result from the search results set associated with the second search object component; augment the second search object component with a link to the second best-matching search result, such that to generate a second augmented search object component including the link; and wherein to compile the search engine results page, the processor is configured to include the first augmented search object component and the second augmented search object component.

In some embodiments of the server, the first search object component is based on a first vertical search result and the second search object component is based on a second vertical search result.

According to another broad aspect of the present technology, there is provided a method of processing a search query from a user associated with an electronic device and generating a search result set responsive to the search query. The method is executable at a search server coupled to the electronic device via a communication network. The method comprises: receiving from the electronic device, via the communication network, the search query; determining if the search query is associated with a search object; responsive to the search query being associated with the search object, determining a first object component and a second object component, the first object component and the second object component being semantically linked with the search object; generating a first user actuator being linked to the first object component; generating a second user actuator being linked to the second object component; generating a search engine result page containing the first object component, the second object component, the first user actuator and the second user actuator; the search engine result page being configured: responsive to the user actuating the first user actuator, performing a first action with the first object component; responsive to the user actuating the second user actuator, performing a second action with the second object component.

In some embodiments of the method, the second action is different from the first action.

In some embodiments of the method, the first action comprises one of: highlighting the first object component; augmenting the first object component; removing the second object component from the search engine result page; changing the order of the first object component relative to the second object component.

In some embodiments of the method, the augmenting the first object component comprises inserting a best-matching result from a general search into the first object component.

In some embodiments of the method, the second action comprises one of: highlighting the second object component; augmenting the second object component; removing the first object component from the search engine result page; changing the order of the second object component relative to the first object component.

In some embodiments of the method, the augmenting the second object component comprises inserting a best-matching result from a general search into the second object component.

In some embodiments of the method, the first action and the second action are performed by the electronic device without receiving additional search results from the server.

In some embodiments of the method, the first action and the second action are performed by the electronic device and are based, at least in part, on additional search results received from the server.

In some embodiments of the method, the first action and the second action comprises, respectively, showing the associated first object component and the second object component augmented with additional search results information.

In some embodiments of the method, the first action and the second action comprises, respectively, not showing the other one of the first object component and the second object component.

In some embodiments of the method, the first object component is associated with a first search intent and wherein the first user actuator is indicative of the first search intent.

In some embodiments of the method, the second object component is associated with a second search intent and wherein the second user actuator is indicative of the second search intent.

In some embodiments of the method, the first object component is associated with a first object title and wherein the first user actuator is indicative of the first object title.

In some embodiments of the method, the second object component is associated with a second object title and wherein the second user actuator is indicative of the second object title.

According to another broad aspect of the present technology, there is provided a server. The server comprises: a communication interface for communication with an electronic device via a communication network, a processor operationally connected with the communication interface, the processor configured to: receive, via the communication network, from a user of the electronic device, a search query; determine if the search query is associated with a search object; responsive to the search query being associated with the search object, determine a first object component and a second object component, the first object component and the second object component being semantically linked with the search object; generate a first user actuator being linked to the first object component; generating a second user actuator being linked to the second object component; generate a search engine result page containing the first object component, the second object component, the first user actuator and the second user actuator; the search engine result page being configured: responsive to the user actuating the first user actuator, performing a first action with the first object component; responsive to the user actuating the second user actuator, performing a second action with the second object component.

In some embodiments of the server, the second action is different from the first action.

In some embodiments of the server, the first action comprises one of: highlighting the first object component; augmenting the first object component; removing the second object component from the search engine result page; changing the order of the first object component relative to the second object component.

In some embodiments of the server, to augment the first object component, the processor is configured to insert a best-matching result from a general search into the first object component.

In some embodiments of the server, the second action comprises one of: highlighting the second object component; augmenting the second object component; removing the first object component from the search engine result page; changing the order of the second object component relative to the first object component.

In some embodiments of the server, to augment the second object component, the processor is configured to insert a best-matching result from a general search into the second object component.

In some embodiments of the server, the first action and the second action are performed by the electronic device without receiving additional search results from the server.

In some embodiments of the server, the first action and the second action are performed by the electronic device and are based, at least in part, on additional search results received from the server.

In some embodiments of the server, the first action and the second action comprises, respectively, showing the associated first object component and the second object component augmented with additional search results information.

In some embodiments of the server, the first action and the second action comprises, respectively, not showing the other one of the first object component and the second object component.

In some embodiments of the server, the first object component is associated with a first search intent and wherein the first user actuator is indicative of the first search intent.

In some embodiments of the server, the second object component is associated with a second search intent and wherein the second user actuator is indicative of the second search intent.

In some embodiments of the server, the first object component is associated with a first object title and wherein the first user actuator is indicative of the first object title.

In some embodiments of the server, the second object component is associated with a second object title and wherein the second user actuator is indicative of the second object title.

In accordance with another broad aspect of the present technology, there is provided a method of processing a search query from a user associated with an electronic device and generating a search result set responsive to the search query. The method is executable at a search server coupled to the electronic device via a communication network. The method comprises: receiving from the electronic device, via the communication network, the search query; determining a search object associated with the search query; generating an object component for inclusion into a search engine results page; generating a linked object component associated with the search object by executing: determining a first object domain associated with the search object and a second object domain associated with the search object; determining a first linked object from the first object domain and a second linked object from the second object domain, the first linked object and the second linked objects being semantically linked to the search object; compiling the linked object component having an indication of the first linked object and the second linked object; causing the communication device to display the search engine results page that includes the object component and the linked object component.

In some embodiments of the method, the method further comprising, prior to the receiving, associating the first object domain and the second object domain with the search object.

In some embodiments of the method, the method further comprises storing an indication of an association of the first object domain and the second object domain with the search object in a database accessible by the server.

In some embodiments of the method, the method further comprises appreciating the first object domain and the second object domain.

In some embodiments of the method, the appreciating comprises: visiting a first resource to retrieve an indication of the first object domain; and visiting a second resource to retrieve an indication of the second object domain.

In some embodiments of the method, the first resource and the second resource are associated with a same resource domain.

In some embodiments of the method, the method further comprises executing an object merging routine to determine that the first domain and the second domain are both associated with the same search object.

In some embodiments of the method, the method further comprises, prior to the receiving, associating the first linked object with the first domain and the second linked object with the second domain.

In some embodiments of the method, the method further comprises determining if the first linked object is linked to the search object.

In some embodiments of the method, the determining comprising analyzing a set of properties associated with the first linked object and a set of properties associated with the search object to determine if the first linked object is linked to the search object.

In some embodiments of the method, the set of properties respectively associated with the search object and the first linked object is indicative of a degree of certainty that the first linked object is linked to the search object.

In some embodiments of the method, the determining further comprises analyzing search engine queries where the search object and the first linked object are searched together.

In some embodiments of the method, the method further comprises storing an indication of an association of the first linked object with the first domain and the second linked object with the second domain in a database accessible by the server.

In some embodiments of the method, the generating a linked object component associated with the search object further comprises inserting a first object domain filter associated with the first object domain and a second object domain filter associated with the second object domain.

In some embodiments of the method, responsive to the user actuating a respective one of the first object domain filter and the second object domain filter, the method further comprises executing a linked object component action associated therewith.

In accordance with another broad aspect of the present technology, there is provided a server. The server comprises: a communication interface for communication with an electronic device via a communication network, a processor operationally connected with the communication interface, the processor configured to: receive, via the communication network, from a user of the electronic device, a search query; determine a search object associated with the search query; generate an object component for inclusion into a search engine results page; generate a linked object component associated with the search object by executing: determining a first object domain associated with the search object and a second object domain associated with the search object; determining a first linked object from the first object domain and a second linked object from the second object domain, the first linked object and the second linked objects being semantically linked to the search object; compiling the linked object component having an indication of the first linked object and the second linked object; causing the communication device to display the search engine results page that includes the object component and the linked object component.

In some embodiments of the server, the processor is further operable to, prior to a point of time when it receives the search request, associate the first object domain and the second object domain with the search object.

In some embodiments of the server, the processor is further operable to store an indication of an association of the first object domain and the second object domain with the search object in a database accessible by the server.

In some embodiments of the server, the processor is further operable to appreciate the first object domain and the second object domain.

In some embodiments of the server, to appreciate, the processor is configured to: visit a first resource to retrieve an indication of the first object domain; and visit a second resource to retrieve an indication of the second object domain.

In some embodiments of the server, the first resource and the second resource are associated with a same resource domain.

In some embodiments of the server, the processor is further operable to execute an object merging routine to determine that the first domain and the second domain are both associated with the same search object.

In some embodiments of the server, the processor is further operable to, prior to the point of time when it receives the search request, associate the first linked object with the first domain and the second linked object with the second domain.

In some embodiments of the server, the processor is further operable to determine if the first linked object is linked to the search object.

In some embodiments of the server, to determine if the first linked object is linked to the search object, the processor is configured to analyze a set of properties associated with the first linked object and a set of properties associated with the search object to determine if the first linked object is linked to the search object.

In some embodiments of the server, the set of properties respectively associated with the search object and the first linked object is indicative of a degree of certainty that the first linked object is linked to the search object.

In some embodiments of the server, to determine if the first linked object is linked to the search object, the processor is further configured to analyze search engine queries where the search object and the first linked object are searched together.

In some embodiments of the server, the processor is further operable to store an indication of an association of the first linked object with the first domain and the second linked object with the second domain in a database accessible by the server.

In some embodiments of the server, to generate a linked object component associated with the search object, the processor is further operable to insert a first object domain filter associated with the first object domain and a second object domain filter associated with the second object domain.

In some embodiments of the server, responsive to the user actuating a respective one of the first object domain filter and the second object domain filter, the first object domain filter and the second object domain filter are configured to cause the electronic device top execute a linked object component action associated therewith.

In the context of the present specification, unless provided expressly otherwise, a "server" is a computer program that is running on appropriate hardware and is capable of receiving requests (e.g. from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, unless provided expressly otherwise, "client device" is any computer hardware that is capable of running software appropriate to the relevant task at hand. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, unless provided expressly otherwise, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, unless provided expressly otherwise, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, unless provided expressly otherwise, the expression "component" is meant to include software (appropriate to a particular hardware context) that is both necessary and sufficient to achieve the specific function(s) being referenced.

In the context of the present specification, unless provided expressly otherwise, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, unless provided expressly otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

Figure 3:
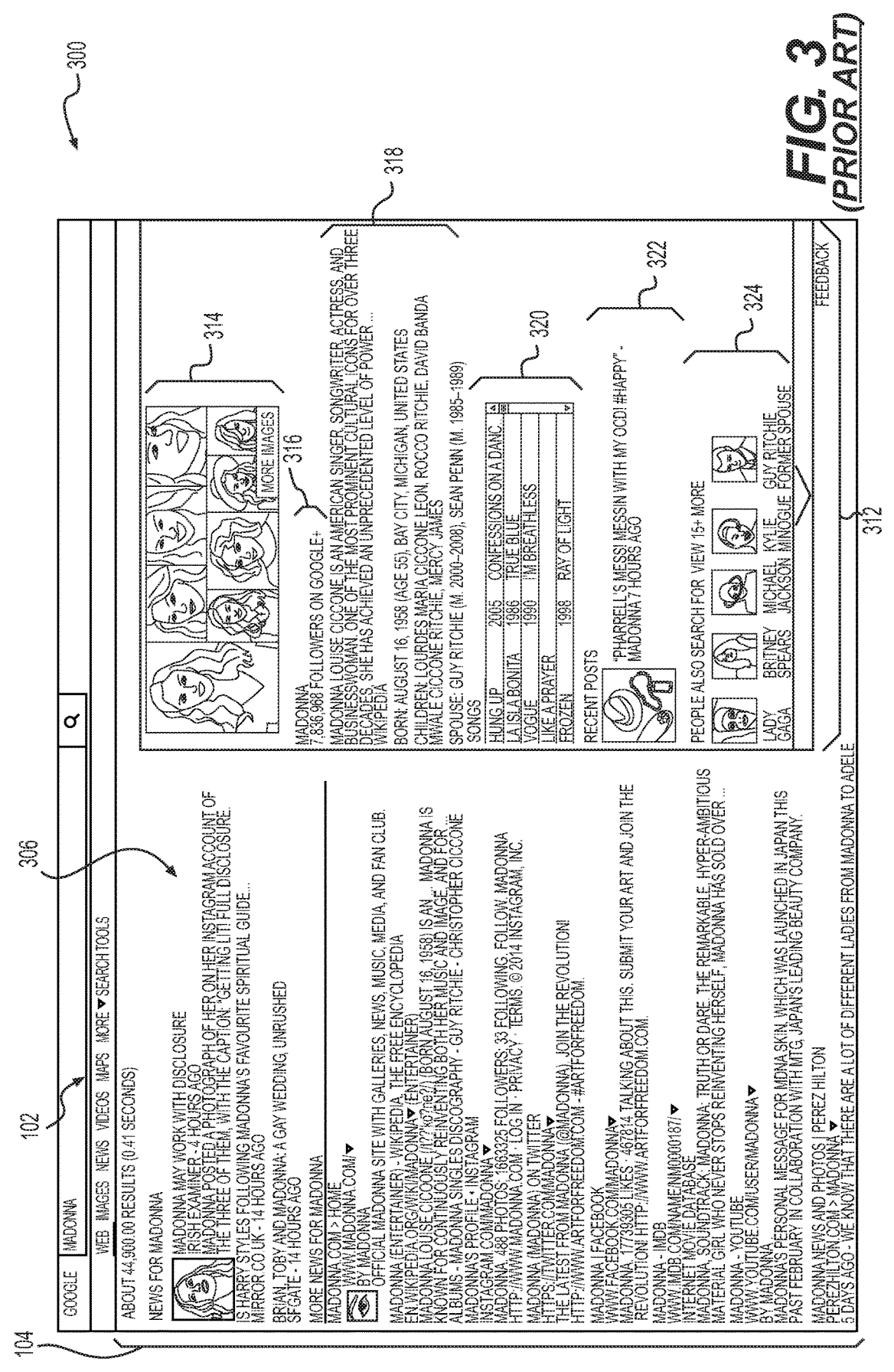

FIG. 3 depicts a screen shot 300, the screen shot 300 depicting a SERP implemented in accordance with other known techniques.

DETAILED DESCRIPTION

Figure 1:
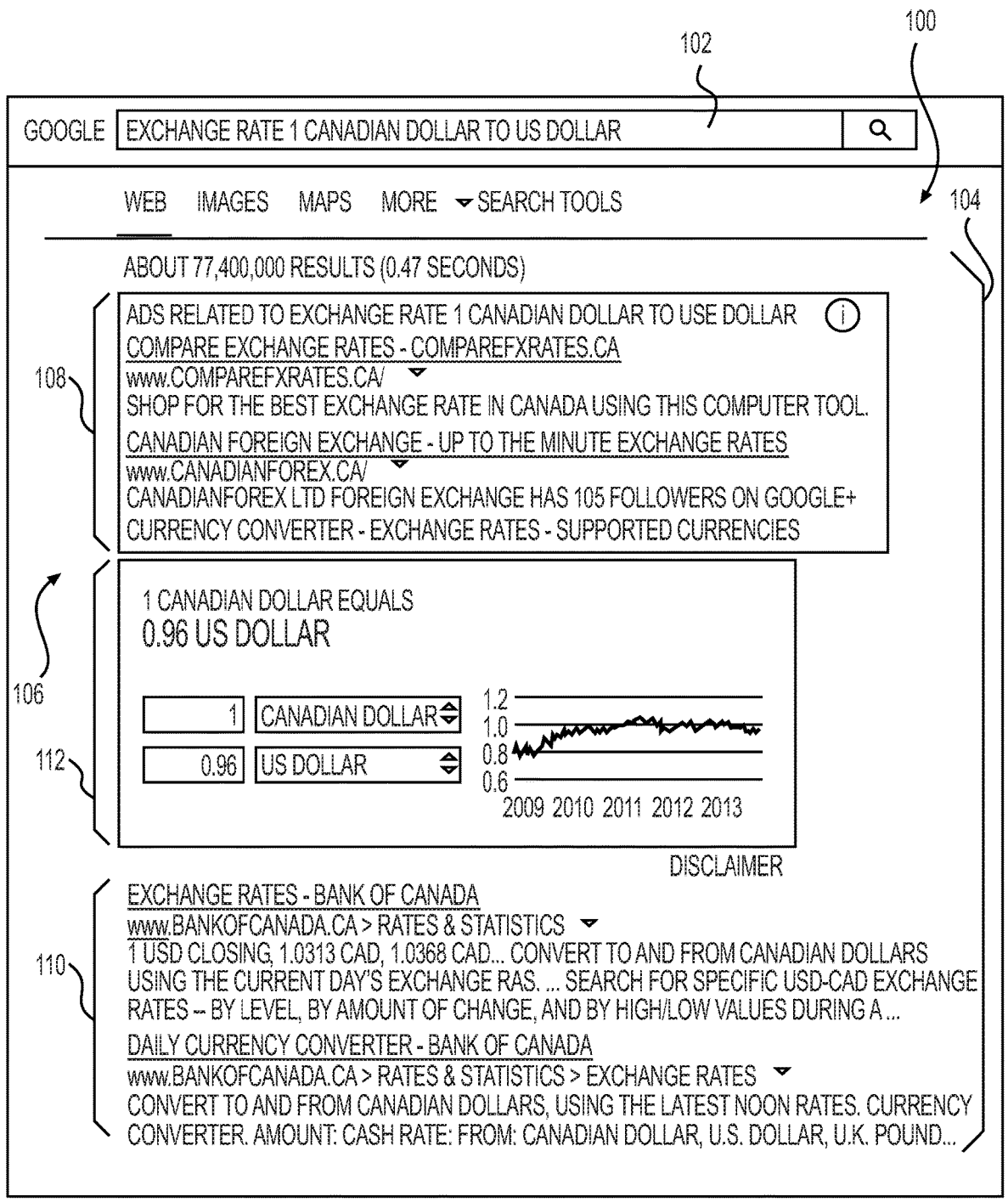
FIG. 1 depicts a screen shot 100, the screen shot 100 depicting a SERP implemented in accordance with the known techniques.
Figure 2:
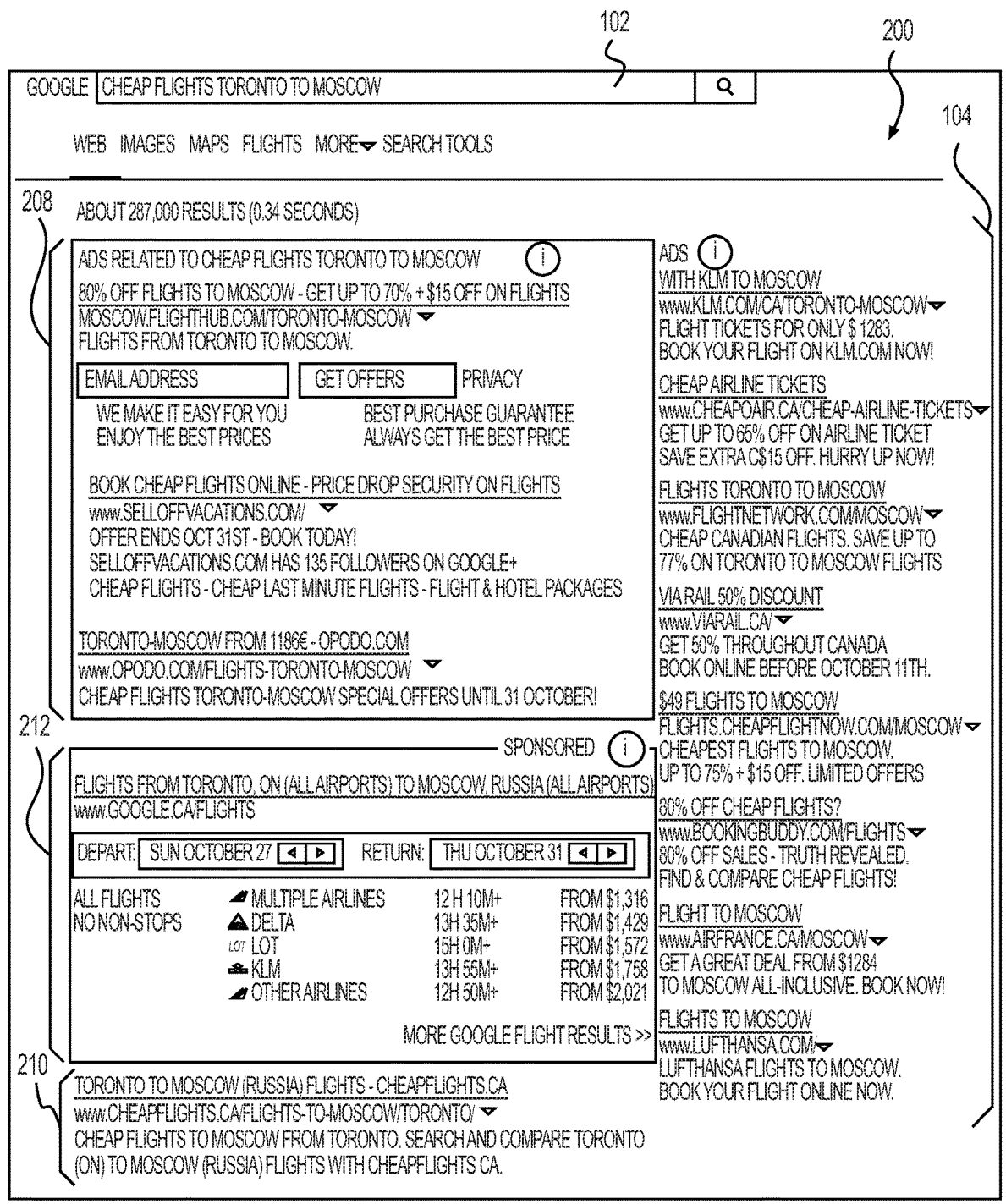
FIG. 2 depicts a screen shot 200, the screen shot 200 depicting a SERP implemented in accordance with other known techniques.
Figure 4:
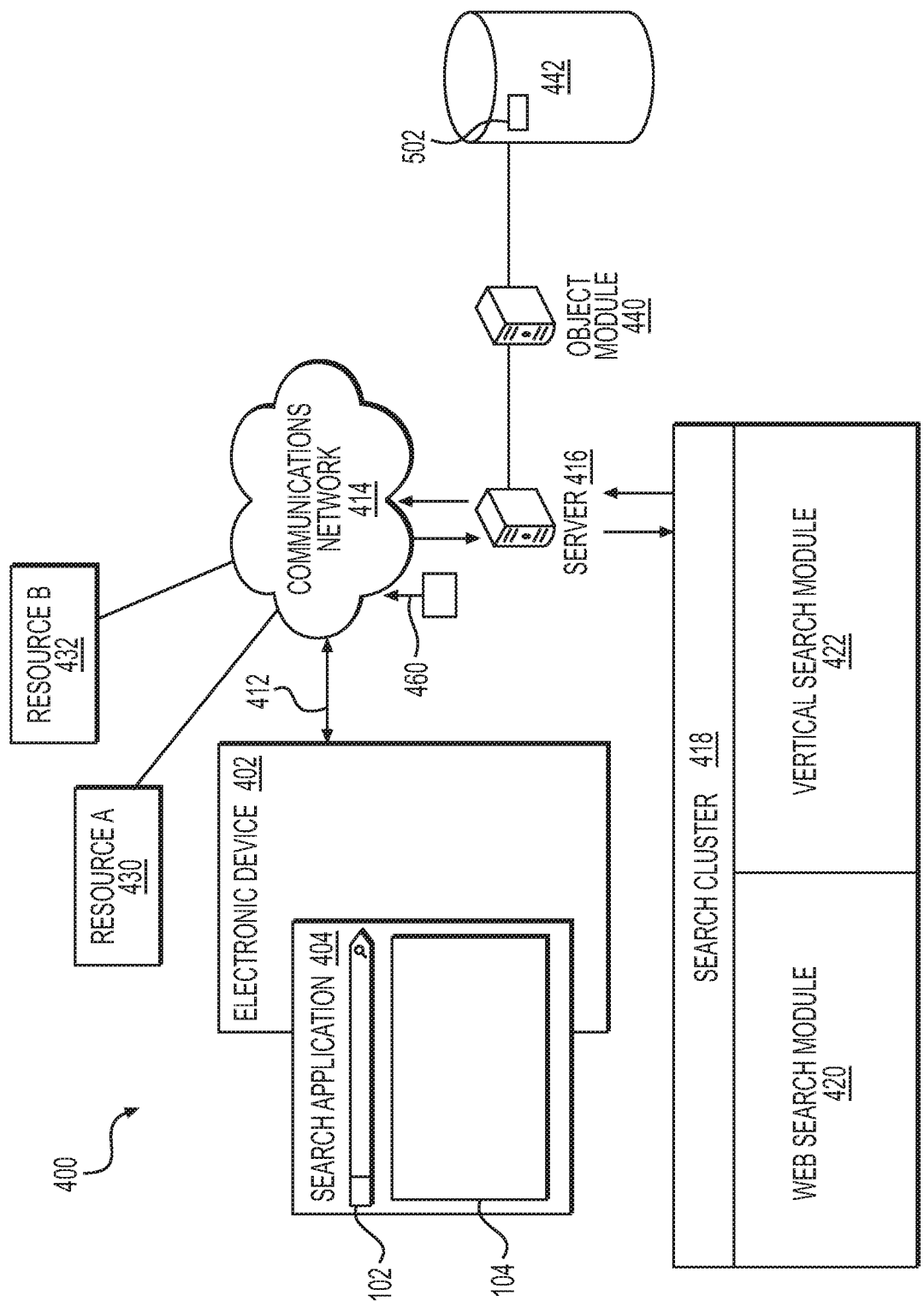
FIG. 4 is a schematic diagram depicting a system 400, the system 400 being implemented in accordance with non-limiting embodiments of the present technology.

Referring to FIG. 4, there is shown a schematic diagram of a system 400, the system 400 being suitable for implementing non-limiting embodiments of the present technology. It is to be expressly understood that the system 400 is depicted as merely as an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 400 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology. As a person skilled in the art would understand, this is likely not the case. In addition it is to be understood that the system 400 may provide in certain instances simple implementations of the present technology, and that where such is the case they have been presented in this manner as an aid to understanding. As persons skilled in the art would understand, various implementations of the present technology may be of a greater complexity.

The system 400 comprises an electronic device 402. The electronic device 402 is typically associated with a user (not depicted) and, as such, can sometimes be referred to as a "client device". It should be noted that the fact that the electronic device 402 is associated with the user does not need to suggest or imply any mode of operation—such as a need to log in, a need to be registered or the like.

The implementation of the electronic device 402 is not particularly limited, but as an example, the electronic device 402 may be implemented as a personal computer (desktops, laptops, netbooks, etc.), a wireless communication device (a cell phone, a smartphone, a tablet and the like), as well as network equipment (a router, a switch, or a gateway). The electronic device 402 comprises hardware and/or software and/or firmware (or a combination thereof), as is known in the art, to execute a search application 404. Generally speaking, the purpose of the search application 404 is to enable the user (not depicted) to execute a search, such as the above mentioned web search using the above-mentioned search engine. To that end, the search application 404 comprises the aforementioned query interface 102 and search results interface 104.

How the search application 404 is implemented is not particularly limited. One example of the search application 404 may be embodied in a user accessing a web site associated with a search engine to access the search application 404. For example, the search application can be accessed by typing in an URL associated with Yandex search engine at www.yandex.ru. It should be expressly understood that the search application 404 can be accessed using any other commercially available or proprietary search engine.

In alternative non-limiting embodiments of the present technology, the search application 404 may be implemented as a browser application on a portable device (such as a wireless communication device). For example (but not limited) to those implementations, where the electronic device 402 is implemented as a portable device, such as for example, Samsung™ Galaxy™ SIII, the electronic device may be executing a Yandex browser application. It should be expressly understood that any other commercially available or proprietary browser application can be used for implementing non-limiting embodiments of the present technology.

The electronic device 402 is coupled to a communications network 414 via a communication link 412. In some non-limiting embodiments of the present technology, the communications network 414 can be implemented as the Internet. In other embodiments of the present technology, the communications network 414 can be implemented differently, such as any wide-area communications network, local-area communications network, a private communications network and the like.

How the communication link 412 is implemented is not particularly limited and will depend on how the electronic device 402 is implemented. Merely as an example and not as a limitation, in those embodiments of the present technology where the electronic device 402 is implemented as a wireless communication device (such as a smart-phone), the communicated link 102 can be implemented as a wireless communication link (such as but not limited to, a 3G communications network link, a 4G communications network link, a Wireless Fidelity, or WiFi® for short, Bluetooth® and the like). In those examples, where the electronic device 402 is implemented as a notebook computer, the communication link can be either wireless (such as the Wireless Fidelity, or WiFi® for short, Bluetooth® or the like) or wired (such as an Ethernet based connection).

It should be expressly understood that implementations for the electronic device 402, the communication link 412 and the communications network 414 are provided for illustration purposes only. As such, those skilled in the art will easily appreciate other specific implementational details for the electronic device 402, the communication link 412 and the communications network 414. As such, by no means, examples provided herein above are meant to limit the scope of the present technology.

Also coupled to the communications network is a server 416. The server 416 can be implemented as a conventional computer server. In an example of an embodiment of the present technology, the server 416 can be implemented as a Dell™ PowerEdge™ Server running the Microsoft™ Windows Server™ operating system. Needless to say, the server 416 can be implemented in any other suitable hardware and/or software and/or firmware or a combination thereof. In the depicted non-limiting embodiment of present technology, the server 416 is a single server. In alternative non-limiting embodiments of the present technology, the functionality of the server 416 may be distributed and may be implemented via multiple servers.

The implementation of the server 416 is well known. However, briefly speaking, the server 416 comprises a communication interface (not depicted) structured and configured to communicate with various entities (such as the electronic device 402, for example and other devices potentially coupled to the communication network 414) via the communication network 414. The server 416 further comprises at least one computer processor (not depicted) operationally connected with the communication interface and structured and configured to execute various processes to be described herein.

The server 416 is communicatively coupled (or otherwise has access) to a search cluster 418. As such, the server 416 can be sometimes referred to as a "search server" or a "search front-end server". Even though the search cluster 418 is depicted as a separate server from the server 416, in alternative embodiments, the functionality of the search cluster 418 can be implemented by the server 416. In alternative non-limiting embodiments of the present technology, the functionality of the search cluster 418 may be distributed and may be implemented via multiple servers.

The general purpose of the search cluster 418 is to perform searches in response to the user queries inputted via the query interface 102 and to output search results to be presented to the user using the search results interface 104. What follows is a description of one non-limiting embodiment of the implementation for the search cluster 418. However, it should be understood that there is a number of alternative non-limiting implementations of the search cluster 418 possible. It should be also expressly understood that in order to simplify the description presented herein below, the configuration of the search cluster 418 has been greatly simplified. It is believed that those skilled in the art will be able to appreciate implementational details for the search cluster 418 and for components thereof that may have been omitted for the purposes of simplification of the description.

Generally speaking the purpose of the search cluster 418 is to (i) conduct searches (details will be explained herein below); (ii) execute analysis of search results and perform ranking of search results; (iii) group results and compile the search result page (SERP) to be outputted to the electronic device 402 as the SERP. How the search cluster 418 is configured to execute searches is not particularly limited. Those skilled in the art will appreciate several ways and means to execute the search using the search cluster 418 and as such, several structural components of the search cluster 418 will only be described at a high level.

In some embodiments of the present technology, the search cluster 418 can execute several searches, including but not limited to, a general search and a vertical search. Thus, in some non-limiting embodiments of the present technology, the search cluster 418 comprises (or, otherwise, has access to) a web search module 420 and a vertical search module 422. The web search module 420 is configured to perform general web searches, as is known to those of skill in the art. The vertical search module 422 is configured to execute one or more vertical searches, such as an images vertical search, a music vertical search, a video vertical search, a news vertical search, a maps vertical search and the like.

In some non-limiting embodiments of the present technology, the search cluster 418 can execute what is known as a multi-level search. These non-limiting embodiments can be implemented, for example, to increase the speed of the search and to obtain more relevant search results. Briefly, the search cluster 418 can execute some or all of a top level meta search, a middle level meta search and a bottom level search of the indexed web resources, an indication of which is stored in an index (not depicted) associated with the web search module 420. To that end, the search cluster 418 is also configured to, as is known to those of skill in the art, execute a crawler algorithm—which algorithm causes the search cluster 418 to "crawl" the Internet and index visited web sites into one or more of the index databases (not depicted).

In parallel or in sequence with the general web search executed by the web search module 420, the vertical search module 422 is configured to perform one or more vertical searches within the respective vertical databases (not depicted). For the purposes of the description presented herein, the term "vertical" (as in vertical search) is meant to connote a search performed on a subset of a larger set of data, the subset having been grouped pursuant to an attribute of data. For example, to the extent that the one of the vertical searches performed by the vertical search module 422 is an image service, the vertical search module 422 can be said to search a subset (i.e. images) of the set of data (i.e. all the data potentially available for searching), the subset of data being stored in the database (not depicted) associated with the vertical search module 422. Needless to say that even though a single one of the vertical search module 422 is depicted in FIG. 4, the search cluster 418 can implement multiple instances of the vertical search modules 422, each of the vertical search modules 422 being responsible for executing a respective vertical search.

Now, once the web search module 420 and the vertical search module 422 return their respective search results, the search cluster 418 is configured to generate a ranked search results list, including the results from the web search module 420 and the vertical search module 422. Multiple algorithms for ranking the search results are known and can be implemented by the search cluster 418.

Just as an example and not as a limitation, some of the known techniques for ranking search results by relevancy to the user-submitted search query are based on some or all of: (i) how popular a given search query or a response thereto is in searches conducted by either the web search module 420 or the vertical search module 422; (ii) how many results have been returned by either the web search module 420 or the vertical search module 422; (iii) whether the search query contains any determinative terms (such as "images", "movies", "weather" or the like), (iv) how often a particular search query is typically used with determinative terms by other users; and (v) how often other uses performing a similar search have selected a particular resource or a particular vertical search results when results were presented using the SERP.

Within this description, the term "determinative term" shall mean a word or a string of words indicative of the fact that a given search result is more likely to have the most relevant response to the user search query. For example, if the search query contains the term "images" it can be determined, by the search cluster 418 that the vertical search module 422 executing the images vertical search is likely to be the service that contains the most relevant results to the user query.

Needless to say, only a sub set of these, or these combined to others or any combination of other factors may be taken into account when ranking the search results for relevancy.

The search cluster 418 is then configured to transmit ranked search results to the server 416. The server 416 can then transmits, via the communications network 414, the ranked search results to the electronic device 402 for display to the user as the SERP 306. Typically, the server 416 can be configured to generate a JavaScript Object Notation (JSON) message, the JSON message containing information that is instrumental for causing the electronic device 402 to display the SERP containing the ranked search results produced by the search cluster 418. Needless to say the message can be in formats other than JSON, such as Extensible Markup Language (XML) format and the like.

Within the architecture of the system 400, there is also provided an object module 440. Similar to the server 416, the object module 440 can be implemented as a conventional computer server. In an example of an embodiment of the present technology, the object module 440 can be implemented as a Dell™ PowerEdge™ Server running the Microsoft™ Windows Server™ operating system. Needless to say, the object module 440 can be implemented in any other suitable hardware and/or software and/or firmware or a combination thereof. In the depicted non-limiting embodiment of present technology, the object module 440 is a single server. In alternative non-limiting embodiments of the present technology, the functionality of the object module 440 may be distributed and may be implemented via multiple servers.

Even though in the depicted embodiment, the object module 440 is depicted as a separate server, in alternative embodiments, functionality of the object module 440 can be implemented by the server 416 or by the search cluster 318 or can be distributed between the two.

The system 400 further includes a first resource A 430 and a second resource B 432, both coupled to the communications network 414. Each of the first resource A 430 and the second resource B 432 is representative of a network resource accessible (by either, some or all of: the electronic device 402, the server 416 and the object module 440) through the communications network 414 and maintaining certain information.

Just as examples, the first resource A 430 can be a web resource hosting the WIKIPEDIA™ ("The Free Encyclopedia") web resource, accessible for example at the following URL: www.wikipedia.org. Just as another example, the second resource B 432 can be a web resource hosting the IMBd resource, accessible for example at the following URL: www.imbd.com. It should be expressly understood that the first resource A 430 and the second resource 432 can be implemented differently and that a number of additional web resources (similar or different to the examples of the first resource A 430 and the second resource 432 provided above) can be present within alternative implementations of the system 400.

Figure 5:
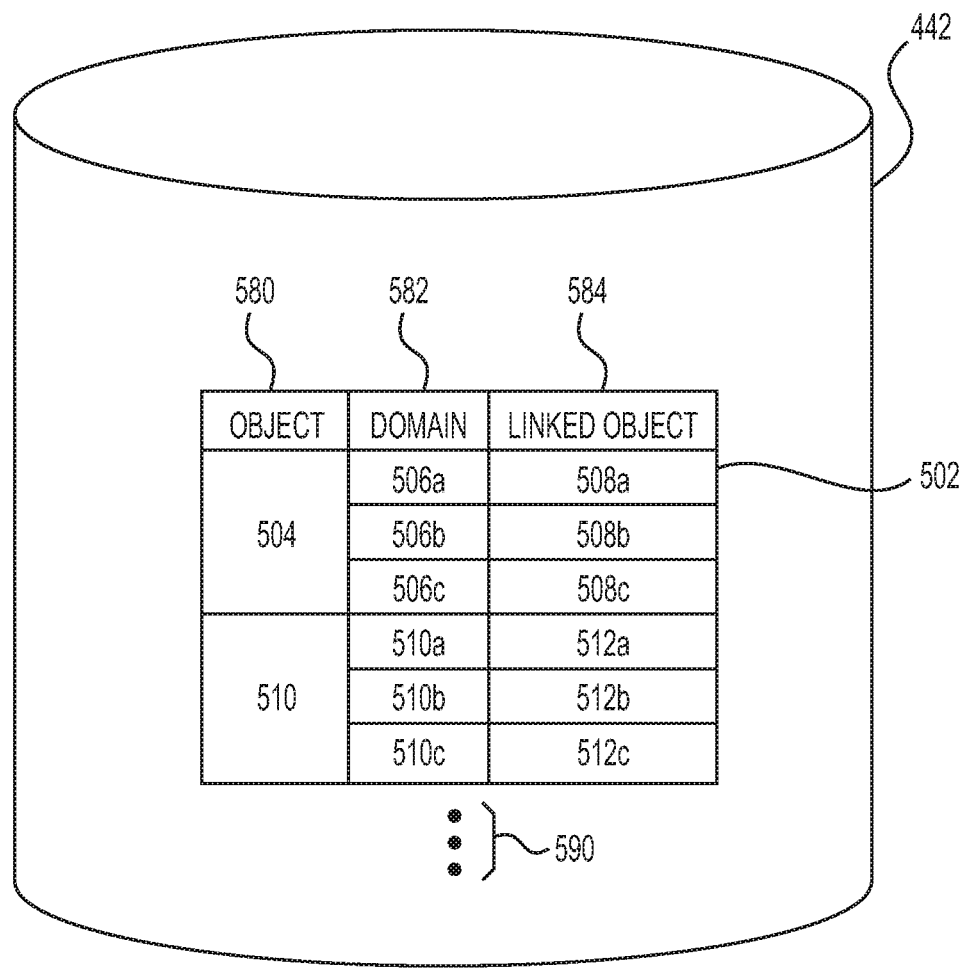
FIG. 5 is a diagram a table 502, the table 502 being maintained by an object database 442 of the system 400 of FIG. 4.

The object module 440 is configured to maintain an object database 442. With reference to FIG. 5, a non-limiting embodiment of a table 502 maintained by the object module 440 within the object database 442 will be described—first within the context of populating the table 502 with search object information and secondly within the context of using the table 502 to populate search object information in response to a user-submitted search request.

Starting with a general overview, the table 502 maps an indication of an object 580, to an indication of a domain 582 associated with the object and an indication of linked objects 584 associated with the object within the domain. For illustration purposes, let it be assumed that the table 502 maintains information about two objects—a first object 504 and a second object 510. Naturally, the table 502 may maintain information about a plurality of additional objects, schematically depicted at 590. And as such teachings presented herein will apply mutatis mutandis to all of the plurality of additional objects 590 potentially present within the table 502.

Within the depicted embodiment of FIG. 5, the first object 504 is associated with three object domains—a first object first domain 506a, a first object second domain 506b and a first object third domain 506c. Within each of the domains (the first object first domain 506a, the first object second domain 506b and the first object third domain 506c), the first object 504 is associated with a respective linked object: a first object first linked object 508a, a first object second linked object 508b and a first object third linked object 508c.

Even though only a single instance of a linked object for each domain has been depicted (i.e. the first object first linked object 508a, the first object second linked object 508b and the first object third linked object 508c), naturally the indication of linked object 584 can have an indication of multiple linked objects for each of the object domains (i.e. multiple respective ones of the first object first linked object 510a, the first object second linked object 510b and the first object third linked object 510c).

By the same token, the second object 510 is associated with three domains—a second object first domain 510a, a second object second domain 510b and a second object third domain 510c. Within each of the domains (the second object first domain 510a, the second object second domain 510b and the second object third domain 510c), the second object 510 is associated with a respective linked object: a second object first linked object 512a, a second object second linked object 512b and a second object third linked object 512c. Even though only a single instance of a linked object for each domain has been depicted (i.e. the second object first linked object 510a, the second object second linked object 510b and the second object third linked object 510c), naturally the indication of linked object 584 can have an indication of multiple linked objects for each of the domains (i.e. multiple respective ones of the second object first linked object 510a, the second object second linked object 510b and the second object third linked object 510c).

For the purposes of illustrating the process of compiling information within the table 502, we will use the example mentioned before. Let it be assumed that the first object 504 is associated with "Madonna" and the second object 510 is associated with "Angelina Jolie".

As part of the above-described crawling process or as part of a separate process, the object module 440 obtains information from a multitude of web resources within the communication network 414, including the first resource A 430 and the second resource B 432. The process can be broadly referred to as "object information collection" process. Within this information from the multitude of web resources, the object module 440 obtains information about one or more objects. For example, as part of the object information collection process, the object module 440 receives information from the first resource A 430 (being the web resource hosting the WIKIPEDIA ("The Free Encyclopedia") web resource) and appreciates information about the first object 504 (being Madonna) and the second object 510 (being Angelina Jolie).

Once the object module 440 has received at least a portion of the information available within the first resource A 430 associated with the first object 504 (i.e. the Wikipedia article on "Madonna (entertainer)"), the object module 440 analyzes at least the portion of the information so received. The object module 440 is configured to execute one or more machine learning routines, pattern recognition routines, heuristics analysis (or any other suitable routines) to analyze the information contained within the information available within the first resource A 430 in regard to Madonna as a search object.

As part of this analysis, the object module 440 extracts (i) one or more object domains associated with the first object 504, if available and (ii) one or more linked objects from at least one from the one or more object domains associated with the first object 504, if available.

Within this illustrated example, the object module 440 determines the following object domains associated with the first object 504: "ENTERTAINER", "ACTRESS" and "WRITER" that are present within information that the first resource A 430 maintains about the first object 504 (i.e. information contained in the WIKIPEDIA article about Madonna). The object module 440, thus, populates the aforementioned first object first domain 506a, first object second domain 506b and first object third domain 506c fields with respective indications of "ENTERTAINER", "ACTRESS" and "WRITER" object domains.

The object module 440 then attempts to locate at least one linked object and to categorize them into one of the above (or different) object domains associated with the first object 504. Within the illustrated embodiment, the object module 440 extracts the following linked objects: <Partners><Sean Penn><Guy Ritchie><Carlos Leon> and <Relatives><Christopher Ciccone>. In some embodiments of the present technology, the object module 440 extracts the at least one linked objects by analyzing the labels attributed thereto by the first resource A 430. For example, in case of the WIKIPEDIA resource, Sean Penn is labelled as a "Spouse" and Christopher Ciccone is labelled as "Brother". Within these embodiments, the object module 440 can extract linked objects based on their associated labels.

In alternative embodiments, the linked objects may be referenced within the information contained within the first resource A 430, but it may not be necessarily expressly labelled as such. Within these embodiments, the object module 440 can determine linked objects by applying a "linked objects determination routine". An example of an embodiment of the linked objects determination routine may include a process of analyzing links or references between the various objects within the information of the first resource A 430.

To illustrate the above, several heuristic rules can be applied. For example, if an object A reference an object B through a common relative (such as a mother), object A and object B can be grouped as linked objects with a high degree of certainty. On the other hand, if object X and object Y reference each other as both being born in New York (and that is the sole point of reference between the two objects X,Y), they can be deemed not to be linked objects with a high degree of certainty.

In some embodiments of the present technology, the object module 440 can further use users' interest weights to determine if any two given objects are linked. For example, let's say there is a rumor out there that object A starts to date object B. As such, multiple users searching the Internet using the search engine hosted by the server 416 start submitting searches for "object A and object B dating". The server 416 can transmit the indication of the sudden spike of interest in searches for the combination for object A and object B to the object module 440 and the object module 440 can use this as a weight factor in determining whether object A and object B should be considered to be linked objects.

The list of factors that can be considered for determining linked objects presented above is non-exhaustive. Some other examples of the factors that can be considered in determining linked object include:

a list of query re-formulations from the first object 504 to the second object 510;

weights assigned to the links between the first object 504 and the second object 510 (using above examples of shared relative and shared birth place);

the number of shared categories within a given web resource, such as the first resource A 430, for example;

the number of followers in a social network shares by the first object 504 and the second object 510 and/or the number of shared followers;

the number of shared object domains between the first object 504 and the second object 510;

the difference in age between the first object 504 and the second object 510;

whether or not there is a blood relationship between the first object 504 and the second object 510;

the type of the first object 504 and the second object 510;

presence or absence of shared object sub-types between the first object 504 and the second object 510;

the frequency of shared key words between the first object 504 and the second object 510;

relative ratings of the first object 504 and the second object 510 within one of the first resource A 430 and the second resource B 432;

the number of votes for the first object 504 and the second object 510 within one of the first resource A 430 and the second resource B 432;

the number of downloads of work products (music, videos, books, etc) of the first object 504 and the second object 510 within one of the first resource A 430 and the second resource B 432;

the number of streams of work products (music, videos, books, etc) of the first object 504 and the second object 510 within one of the first resource A 430 and the second resource B 432;

the number of users followed links from the first object 504 and the second object 510 and vice versa;

the distance from the first object 504 and the second object 510 using the wikidata graph;

how often the first object 504 and the second object 510 are mentioned in a single Internet search query;

how often the first object 504 and the second object 510 are mentioned in a single web resource;

and the like.

The object module 440 then populates the first object first linked object 508a with the above identified linked objects in association with the first object first domain 506a.

The object module 440 can receive additional information from one or more additional sources, such as the second resource B 432. Within at least a portion of the information available within the second resource B 432 associated with the first object 504 (i.e. the IMBd information page on movies starring Madonna).

The object module 440 is configured to execute one or more routines to merge object information from the second source B 432 with the object information the object module 440 has already obtained from the first resource A 430. In other words the object module 440 is configured to execute an object information merging routine to amalgamate object information from several sources.

As part of the object information merging routine, the following steps can be performed: (i) identification of the same object; (ii) identification of the same or a different object domain and creating new domains in association with the object, if applicable; (iii) merging linked objects into the same or the different object domain.

As part of the identification of the same object sub-routine, the object module 440 determines that the second resource B 432 contains information about the search object that the object module 440 is already aware of (let's say the first object 504). In some embodiments, the object module 440 can identify that the second resource B 434 contains information about the search object that the object module 440 is already aware of based on the title/name of the object. In some cases this may be sufficient (such as, for example, "Toronto city hall" as an object title can be sufficient to execute the same object sub-routine), while in others it may not be (such as "Madonna" or "Notre Dame de Paris", as both can connote multiple objects—singer and religious icon in case of Madonna or monument and musical in case of the Notre Dame de Paris).

Within the latter example, the object module 440 can analyze one or more additional factors associated with the current and the previously discovered objects to determine if there are the same objects or not. For example, continuing with our example of Madonna being the first object 504, the object module 440 can analyze date of birth or any other suitable parameter to determine if the two objects (i.e. the previously discovered first object 504 and a newly discovered search object that potentially may be the same as the first object 504) are the same.

Let it be assumed that the object module 440 determines that the second resource B 432 contains information about the first object 504, the information being associated with a second object domain associated with the first object 504. Continuing with our example of Madonna, let it be assumed that the second object domain is "WRITER". Let it be further assumed that the object module 440 determines another linked object within the second resource B 432, the second linked object being "J K Rowling" and "J. R. R. Tolkien". Within this illustration, the object module populates the second entry of the table 502 in association with the first object 504. More specifically, the object module 440 populates the first object second domain 506b with <WRITER> and the first object second linked object 508b with an indication of <J K Rowling> and <J. R. R. Tolkien>.

Naturally, the object module 440 can continue the object information merging routine in order to receive additional information associated with the first object 504 and to populate the first object third domain 506c and the first object third linked object 508c. Naturally, the table 502 may have a number of additional object domains and a number of additional linked objects within the additional object domains associated with the first object 504. By the same token, the table 502 may have fewer object domains and fewer linked objects within the object domains associated with the first object 504.

The object module 440 can follow a substantially similar process for populating object information associated with the second object 510. Recalling that within the illustrated example, the second object 510 is associated with Angelina Jolie, the object module repeats the linked objects determination routine and the object information merging routine described above (with the substitution of "Angelina Jolie" being the search object rather than "Madonna") to generate some or all of the second object first domain 510a, the second object second domain 510b and the second object third domain 510c and the respective associated the second object first linked object 510a, the second object second linked object 510b and the second object third linked object 510c.

Now, once the table 502 is populated, when the server 416 receives the search request from the electronic device 402 and as part of generating the SERP information, the server 416 obtains object information from the object module 440.

First, the server 416 determines if the search request is susceptible to having an object answer (at least partially). In some embodiments, this is done by querying the object module 440 to check if the object database 442 contains an indication of a search object and the associated search object information that could be responsive to the search query. This can be done by analyzing the search query itself. For example, if the search query contains "Madonna songs", the server 116 and the object module 440 determine that the object database 442 does contain the first object 504 that is potentially responsive to the search query.

In alternative embodiments, the server 416 can analyze one or more search results returned by the search cluster 418 and to query the object module 440 to determine if the object database 442 contains object information complimentary to the query answers provided by the search cluster 418. For example, if the search query contains "Madonna" (with a somewhat unclear search intent), the server 116 can analyze the search query answers provided by the search cluster 418. One of the search query answers, for example, may be the web resource en.wikiedia.org/wiki/Madonna (entertainer). By comparing the information contained in the URL of the web resource or the associated SERP snippet, the server 416 can query the object module 440 and the object module 440 can determine that the object database 442 does contain the first object 504 that is potentially complimentary to the search results provided by the search cluster 418.

In yet further additional embodiments, the search cluster 418, as part of the ranking routine can determine if the search query and/or the search query answers provided by one of the web search module 420 and the vertical search module 422 are associated with a search object or can be complimented by the object information potentially stored in the object database 442.

If the search cluster 418 determines that the search query and/or the search query answers provided by one of the web search module 420 and the vertical search module 422 are associated with a search object and/or can be complimented by the object information potentially stored in the object database 442, the search cluster 418 can trigger the object module 440 to query the object database 442 and to retrieve object information and/or object domains and/or linked objects from the table 442.

The server 416 can then augment the SERP information to be presented to the user of the electronic device 402 with the object information and/or additional information as will be described momentarily. The server 416 then transmits to the electronic device 402, via the communication network 414, a trigger 460 (FIG. 4), the trigger 460 containing the SERP information and the object information and, optionally, additional information. In alternative embodiments, the trigger 460 can contain the SERP information and the object information and, optionally, the additional information can be transmitted via a separate trigger (not depicted). In some embodiments, the trigger 460 is embodied in a JavaScript Object Notation (JSON) message. Alternatively, the trigger 460 can be embodied in an Extensible Markup Language (XML) message. Naturally, the trigger 460 can be embodied in a plethora of additional suitable formats of messages.

In those embodiments, where the separate trigger is employed for one or both the object information and the additional information, the separate trigger can also be embodied in JSON or XML (or any other suitable format) message. Naturally, the format of the trigger 460 and the separate trigger can be the same, but does not need to be the same in every embodiment of the present technology.

For the purposes of the illustration to be presented herein below, we shall assume that the trigger 460 contains information instrumental in causing the electronic device 402 to display to the user SERP information, object information and to display (or execute one or more additional actions based on) the additional information, as will be illustrated momentarily.

Figure 6:
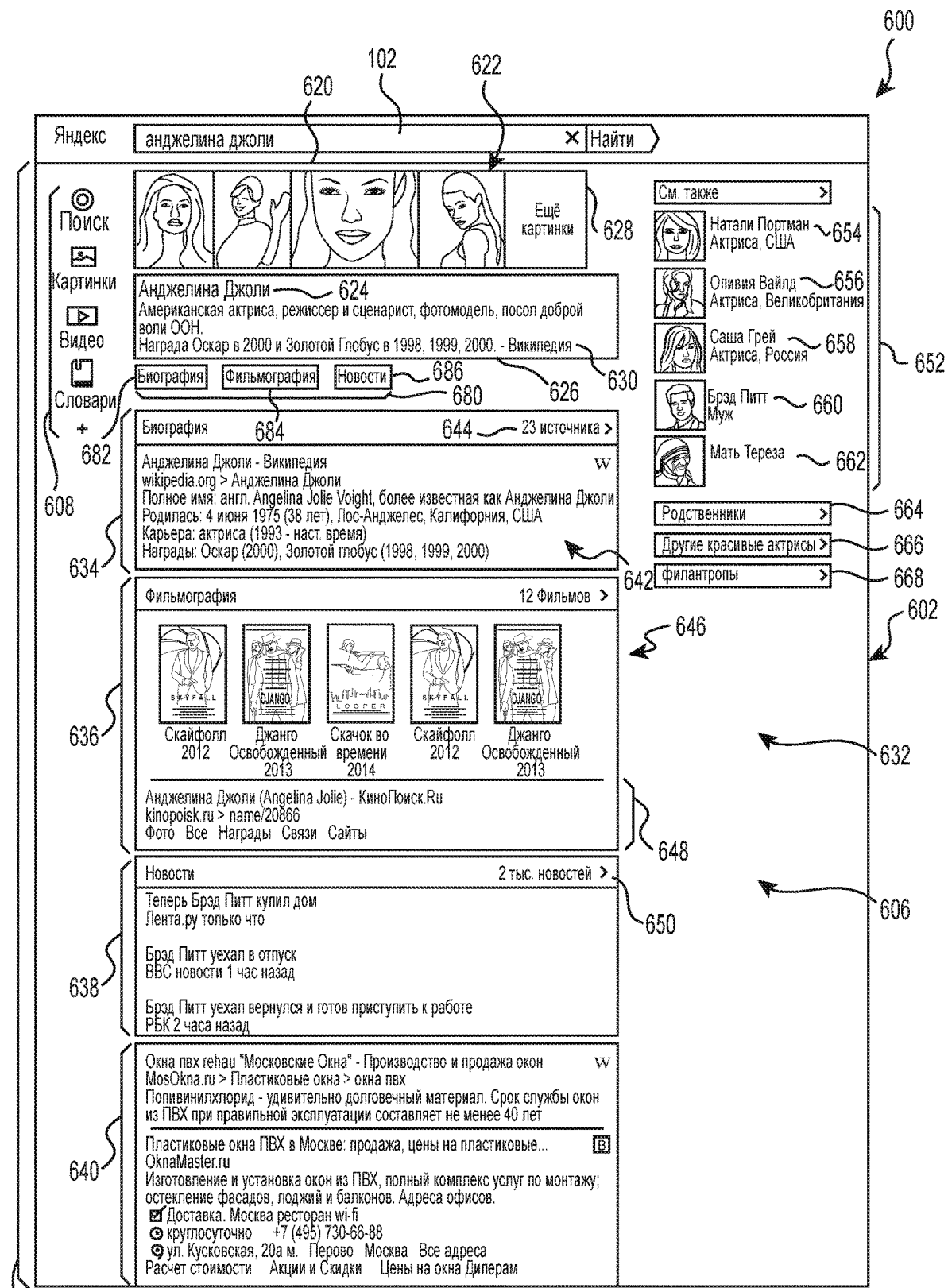
FIG. 6 is a screen shot of a SERP implemented in accordance with non-limiting embodiments of the present technology, the SERP displaying search object information.

With reference to FIG. 6, there is depicted a screen shot 600, the screen shot 600 illustrating a SERP 602, the SERP 602 being implemented in accordance with non-limiting embodiments of the present technology.

Within this illustration, let it be assumed that the user has typed in a search query (using the query interface 102 of the YANDEX™ search engine), the search query containing, in Russian: "Angelina Jolie"("Анджелина Джоли"). The user is presented with the SERP 602 a screen shot of which is represented in FIG. 6 as the screen shot 600. Within the screen shot 600, the user is presented with several conventionally-known fields. Amongst these fields are: the query interface 102 and the search results interface 104. Within the search results interface 104 there is shown the SERP 606, the SERP 606 having several components some of which are implemented in accordance with non-limiting embodiments of the present technology.

The SERP 606 has a navigational panel 608, the navigational panel 608 presenting several buttons (not separately numbered) for navigating between general search and several vertical searches. The remainder of the SERP 606 is arranged and contains information compiled using embodiments of the present technology. Recalling that "Angelina Jolie" can be considered to be an object-type search, the SERP 606 has been compiled with object information and is presented as an object-type SERP.

As such, the SERP 606 includes an object badge 620. The object badge 620 presents general information about the subject object, in this case, about Angeline Jolie. Specifically, the object badge 620 has a plurality of images 622 associated with the object; it has an object title 624 and a short description 626 of the object. Within the illustrated embodiment, the object badge 620 includes 4 images of Angelina Jolie and a button 628 for allowing the user to indicate her desire to see additional images (in Russian: " Еще картинки ").

In some embodiments, the short description 626 is compiled from one or more of the first resource A 420 and the second resource B 422. Within the illustrated embodiment, the short description 626 is compiled from the first resource A 420. Recalling that the first resource A 420 is implemented as WIKIPEDIA, the short description 626 includes a hyperlink 630 to the web page on WIKIPEDIA associated with Angelina Jolie (in Russian: "Википедия").

The SERP 606 further includes one or more search results 632. According to embodiments of the present technology, the one or more search results 632 have been selected and organized using, at least partially, object information maintained by the object module 440.

The one or more search results 632 include: a first search result 634 being search result from the "Biography" search vertical; a second search result 636 being search result from the "Filmography" search vertical; a third search result 638 being a search result from the "News" vertical and a fourth search result 640 being a non-organic search result (i.e. paid placement search result). Naturally, in alternative example, the fourth search result 640 can be an organic (or general) search result. Additionally, the fourth search result 640 can include a plurality of additional search results, which have been omitted from the illustration of FIG. 6 for the sake of simplicity of illustration. Within embodiments of the present technology, the first search result 634; the second search result 636 and the third search result 638 have been generated, at least partially, by the vertical search module 422.

Starting with the first search result 634, the first search result 634 provides first search result information 642 about the search object, including: full name, date of birth, awards and the like. In some embodiments, the first search result 634 is also compiled from the first resource A 430 and, as such, has a link thereto for additional information contained on the first resource A 430. The first search result 634 has a link to additional 23 sources of bibliographical information about the object, the link marked at 644. It should be noted that the actual information presented within the first search result 634 is provided as an example only and will depend on the search query submitted in the query interface 102 (in this case all information presented within the first search result 634 being associated with Angelina Jolie).

Continuing with the second search result 636, the second search result 636 provides second search result information 646 about the search object. Within this example, the second search result information 646 includes links to a plurality of movies associated with the search object. The second search result 636 also includes a link to additional 12 movies associated with the object (the link is not numbered).

According to some embodiments of the present technology, the second search result 636 is augmented with an indication of a best-matching result 648. As such, the second search result 636 can be said to have (i) a first portion that includes vertical search result information and (ii) a second portion that includes the best-matching result. The best-matching result, can be, for example, from the general search performed and generated by the web search module 420. Within the depicted embodiment, the indication of the best-matching result 648 is associated with the web resource "www.kinopoisk.ru". The best-matching result 648 can be modified to point to the specific resource within the best-matching web resource, the specific resource being associated with the search object. Within the depicted embodiment, the best-matching result 648 is the specific resource (i.e. a page on the www.kinopoisk.ru resource) associated with Angelina Jolie.

How the indication of the best-matching result 648 is generated is not particularly limited. For example, the indication of the best-matching result 648 can be generated based on the highest-ranking search result provided by the web search module 420. Alternatively, the object module 440 can maintain an indication of the best-matching resource (or a plurality of best-matching resources associated with each of the objects indication of which is maintained within the table 502).

Now, even though only a single indication of the best-matching result 648 is depicted in FIG. 6, in alternative embodiments of the present technology, there can be provided a plurality of indications of best-matching results 648. For example, it is possible to provide an indication of two best-matching results 648, three best-matching results 648 and the like. It should be also noted that even though only the second search result 636 is augmented with the indication of the best-matching result 648, in alternative embodiments, some or all of the other search results (i.e. the first search result 634 and the third search result 638) can be augmented with their respective indications of the best-matching result 648 (or a plurality of respective indications of the best-matching results 648). By the same token, in alternative embodiments, none of the first search result 634, the second search result 636 and the third search result 638 needs to be augmented with the best-matching results 648. In yet further embodiments, none of the first search result 634, the second search result 636 and the third search result 638 are initially augmented with the best-matching results 648 and only augmented upon receiving an indication from the user (to be described below).

Turning our attention to the third search result 638, the third search result 638 provides an indication of three news items associated with the search object. Within the depicted example, the three news items are from lenta.ru, bbc.ru and rbc.ru news resources. It happens that the three news items are associated with Brad Pitt, who is in turn us associated with Angelina Jolie, the three news items being: "Brad Pitt purchased a house", "Brad Pitt has taken a vacation", "Brad Pitt has returned and is ready for work". The third search result 638 also provides a link to additional 2 thousand news resources, the link depicted at 650.

The fourth search result 640 provides two resources. Within the depicted embodiment, the two resources are special placement resources, which can be ads, banner ads, text ads and the like. Within the depicted illustration, the two special placement resources comprise text ads for "PVC Windows" and are provided as an example only. Targeting strategies for placing ads with SERP 606 are well known in the art and will not be described here at any length.

Alternatively, the fourth search result 640 can provide one or more general search results provided by the web search module 420 responsive to the search query submitted in the query interface 102.

The SERP 606 further includes a linked objects portion 652. The linked object portion 652 can be generated using embodiments of the present technology and, specifically, the information maintained by the object module 440. In a specific embodiment of the present technology, as part of generating information for the linked objects portion 652, the object module 440 retrieves linked objects from at least two object domains associated with the search object (in this case, the search object being Angelina Jolie).

Recalling, that the table 502 maintains three object domains associated with the second object 510 and the associated linked objects, the object module 440 can retrieve an indication from at least two of the second object first domain 510*a*, the second object second domain 510*b* and the second object third domain 510*c* (i.e. the second object first linked object 510*a*, the second object second linked object 510*b* and the second object third linked object 510*c*). In alternative embodiments, the object module 440 can retrieve an indication from all of the available of: the second object first domain 510*a*, the second object second domain 510*b* and the second object third domain 510*c* (i.e. the second object first linked object 510*a*, the second object second linked object 510*b* and the second object third linked object 510*c*). In yet alternative embodiments, the object module 440 can retrieve an indication from just one of: the second object first domain 510*a*, the second object second domain 510*b* and the second object third domain 510*c* (i.e. the second object first linked object 510*a*, the second object second linked object 510*b* and the second object third linked object 510*c*).

Within those embodiments, where the object module 440 retrieves an indication from one or two (or some) of the available ones of: the second object first domain 510*a*, the second object second domain 510*b* and the second object third domain 510*c*, the object module 440 can select the one or the two (or some) of the available ones based: (i) on their statistical popularity; (ii) based on the correlation of the specific object domain to the top search result returned by the search cluster 418, etc.

Using the above routine, the object module 440 generates information instrumental in causing the electronic device 402 to display the linked objects portion 652 that includes: a first linked object 654, a second linked object 656, a third linked object 658, a fourth linked object 660 and a fifth linked object 662.

For the sake if illustration, the first linked object 654 (being "Nathalie Portman"), the second linked object 656 (being "Olivia Wilde") and the third linked object 658 (being "Sasha Grey") have been compiled from one object domain (for example, "ACTRESS" object domain), and the fourth linked object 660 (being "Brad Pitt") has been generated from a second object domain (for example, "RELATIVES") and the fifth linked object 662 (being "Mother Teresa") has been generate from a third object domain (for example, "HUMANITARIANS"). It should be noted that even though in the depicted embodiment, the linked objects portion 652 contains linked objects from three object domains, in alternative embodiments, the linked objects portion 652 can contain linked objects from at least two object domains. In yet alternative embodiments, the linked objects portion 652 can contain linked objects from a single object domain.

The linked objects portion 652 further includes object domain filters: a first object domain filter 664, a second object domain filter 666 and a third object domain filter 668. In some embodiments of the present technology, each of the first object domain filter 664, the second object domain filter 666 and the third object domain filter 668 are generated from respective indications of the second object first domain 510*a*, the second object second domain 510*b* and the second object third domain 510*c*.

Within the depicted embodiment, the first object domain filter 664 is associated with "RELATIVES" object domain, the second object domain filter 666 is associated with "ACTRESSES" and the third domain filter 668 is associated with "HUMANITARIANS" (In Russian, respectively: " Родственники ", " Другие красивые актрисы ", " Филантропы ").

Upon the user actuating one of the first object domain filter 664, the second object domain filter 666 and the third object domain filter 668, the linked objects information presented within the linked objects portion 652 is augmented based on the user selection of the one of: the first object domain filter 664, the second object domain filter 666 and the third object domain filter 668.

For example, if the user selects the first object domain filter 664, the electronic device 402 can augment the representation of the linked objects portion 652 to show linked objects from the first object domain only (i.e. remove linked objects from other object domains).

Alternatively, the electronic device 402 can transmit to the server 416 a request and the server 416 can provide an indication of additional linked objects from the first domain and the electronic device 402 can add additional linked objects from the first object domain to the linked objects portion 652. This is particularly convenient in, but not limited to, those embodiments where the linked objects portion 652 initially includes linked objects from two or more object domains and, hence, the number of linked objects from each domain is limited to certain pre-defined number.

The SERP 606 further includes a plurality of intent filters 680. The plurality of intent filters 680 includes a first intent filter 682, a second intent filter 684 and a third intent filter 686. In some embodiments of the present technology, each of the plurality of intent filters 680 is generated based on the headings of the respective first search result 634, the second search result 636 and the third search result 638.

As such, the first intent filter 682 can be associated with "BIOGRAPHY" search intent, the second intent filter 684 can be associated with "FILMOGRAPHY" search intent and the third intent filter 686 can be associated with "NEWS" search intent.

Alternatively, each of the intent filters 680 can be generated based on frequent search queries performed by other users in association with the search object. Yet in other embodiments, each of the intent filters 680 can be based on most frequent search results selected by other users when performing searches in association with the search object.

In accordance with embodiments of the present technology, when the user actuates one of the first intent filter 682, the second intent filter 684 and the third intent filter 686, the electronic device 402 can perform at least one action with the SERP 606. More specifically, responsive to the user actuating one of the first intent filter 682, the second intent filter 684 and the third intent filter 686, the electronic device 402 can perform at least one action with the first search result 634, the second search result 636 and the third search result 638.

As such, the first intent filter 682, the second intent filter 684 and the third intent filter 686 can be thought of as "SERP actuators" or "user actuators" for changing appearance of at least a portion of the SERP 606. In some embodiments of the present technology, actuation of the SERP actuators changes the appearance of the SERP 606 without performing additional searches and/or sending additional requests to the server 416.

In other words, in some embodiments of the present technology, actuation of the SERP actuators enable the electronic device 402 to execute the changes to the appearance of the information on SERP 606 locally.

Naturally, in alternative non-limiting embodiments of the present technology, the electronic device 402 can request, from the server 416, additional information to be presented on SERP 606 in response to the user actuating one of the first intent filter 682, the second intent filter 684 and the third intent filter 686. For example, the electronic device 402 can request from the server 416 and the server 416 can provide additional vertical or general search results, or a best-matching link, associated with the one of the first intent filter 682, the second intent filter 684 and the third intent filter 686.

The type of the action that is executed in response to the user selecting one of the first intent filter 682, the second intent filter 684 and the third intent filter 686 is not limited. Some non-limiting and non-exhaustive examples are provided below.

Changing appearance of at least one of the first search result 634, the second search result 636 and the third search result 638 that is associated with the actuated respective one of the first intent filter 682, the second intent filter 684 and the third intent filter 686. Changing appearance can take many forms and can include: highlighting, changing color, applying a border or any other type of change in appearance of one of the first search result 634, the second search result 636 and the third search result 638 associated with the actuated respective one of the first intent filter 682, the second intent filter 684 and the third intent filter 686.

Changing the order of at least one of the first search result 634, the second search result 636 and the third search result 638 that is associated with the actuated respective one of the first intent filter 682, the second intent filter 684 and the third intent filter 686 relative to the other ones of the first search result 634, the second search result 636 and the third search result 638. For example, if the user chooses a third intent filter 686, the electronic device 402 can change the appearance of SERP 606 so that the third search result 638 is moved above the first search result 634 and the second search result 636.

Augmenting one of the first search result 634, the second search result 636 and the third search result 638 that is associated with the actuated respective one of the first intent filter 682, the second intent filter 684 and the third intent filter 686 relative to the other ones of the first search result 634, the second search result 636 and the third search result 638.

Augmenting can take many forms. Let us assume that the user has selected the second intent filter 684 associated with the second search result 636. In some embodiments of the present technology, the electronic device 402 can augment the second search result 636 with a video player to preview one of the movies. The indication of the video player can be available locally at the electronic device 402 or can be streamed from the server 416.

In another example, the electronic device 402 can augment the second search result 636 with one or more additional general search results akin to the indication of the best-matching result 648. For example, in some embodiments of the present technology, presentation of the best-matching result 648 can be executed in response to the user actuating the intent filter associated with the search result being augmented with the best-matching result 648.

Figure 7:
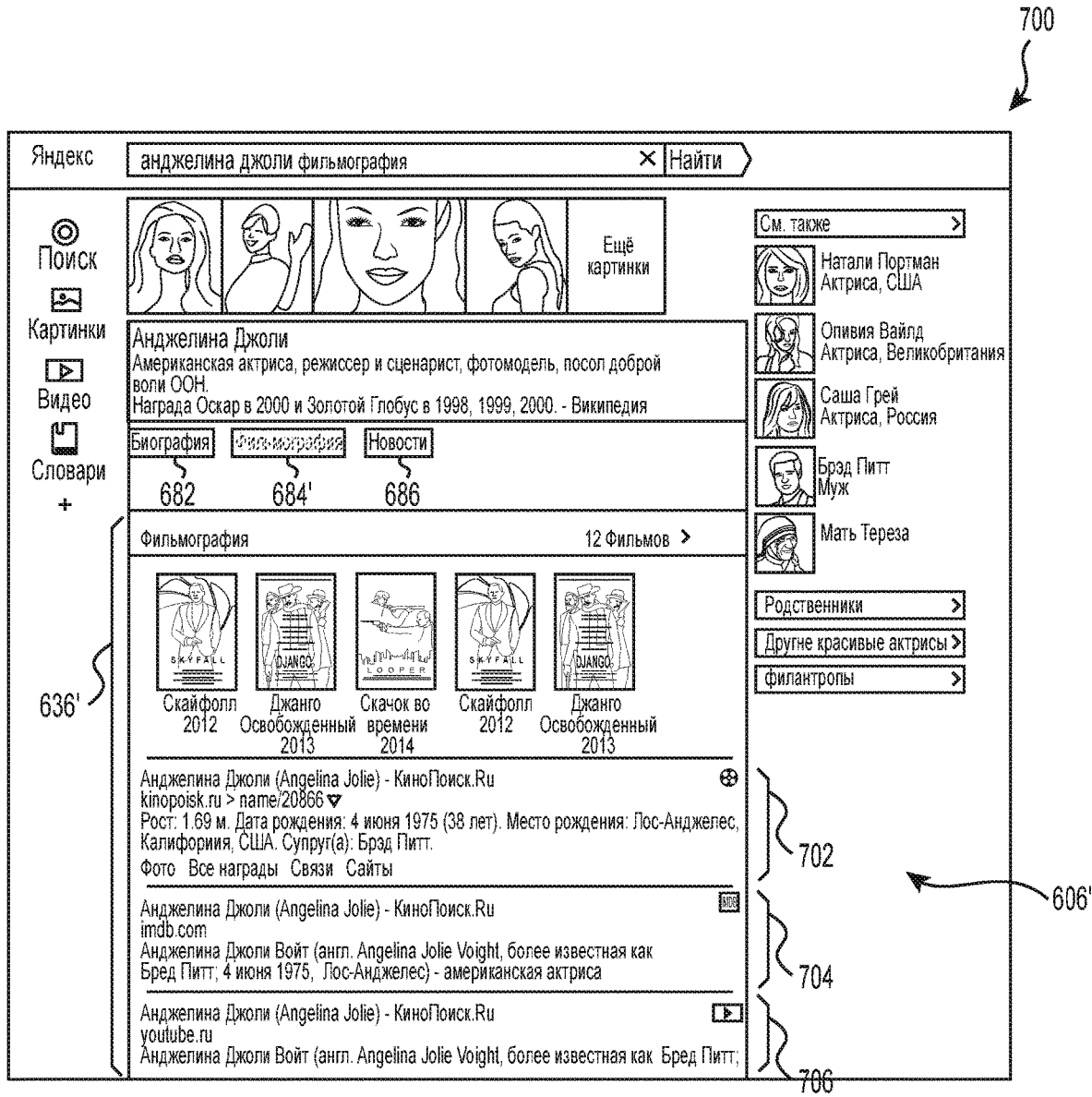
FIG. 7 is a screen shot of a SERP implemented in accordance with non-limiting embodiments of the present technology, the SERP of FIG. 7 being a modified version of the SERP of FIG. 6, modification being executed in response to the user selecting an intent filter.

Removing the search result(s) not matching the selected intent filter. This will be illustrated with reference to FIG. 7, which depicts a screen shot 700. The screen shot 700 depicts a SERP 606', the SERP 606' being a changes version of the SERP 606 after the user has selected the second intent filter 684 of FIG. 6. In FIG. 7, a second intent filter 684' is depicted as shaded to denote to the user that it has been selected.

Responsive to the user selecting the second intent filter 684', the presentation of information within the SERP 606' has been changed. More specifically, the electronic device 402 has removed search results that do not match the search intent associated with the second intent filter 684. More specifically, the electronic device 402 has removed from the SERP 606 the first search result 634, the third search result 638 and the fourth search result 640 as not matching the search intent associated with the selected second intent filter 684'.

As such, the only search result visible within the screen shot 700 is the second search result 636'. Now, in some embodiments, the second search result 636' can have the same appearance as the second search result 636 of FIG. 6. However, in alternative embodiments and as is the case within the illustration of FIG. 7, the second search result 636' has been augmented with additional information. In order execute such additional information augmentation, the electronic device 402 can send a request to the server 416 and the server 416 can transmit additional information to enable the electronic device 402 to augment the second search result 636'. The additional information can include: additional linked objects associated with the selected second intent filter 684', additional search results associated with the search intent of the selected second intent filter 684', additional best matching links associated with the selected second intent filter 684' and the like.

Within the illustrated embodiment, the second search result 636' has been augmented with a first additional information block 702, a second additional information block 704 and a third additional information block 706 (the latter being only partially visible with the illustration of FIG. 7).

The content of the respective one first additional information block 702, the second additional information block 704 and the third additional information block 706 is not particularly limited and what follows is just one example thereof.

Within the illustrated example, the first additional information block 702 includes bibliographical information specifically available on the www.kinopoisk.ru resource. The second additional information block 704 includes other information specifically available on the www.imbd.com resource. The third additional information block 706 includes other information specifically available on the www.youtube.ru resource. Now, it should be understood that the content of the first additional information block 704, the second additional information block 706 and the third information block 706 do not necessarily have to come from the same web resource. They can come from different web resource, as long as they are linked to the search intent associated with the second intent filter 684'.

Now, if the user were to de-select the second intent filter 684', the SERP 606' would return to that depicted at 606 in FIG. 6. By the same token, if the user were to select the other one of the first intent filter 682 or the third intent filter 686, the SERP 606' would be augmented to show the associated information corresponding to the selected of the first intent filter 682 or the third intent filter 686. Also, it should be understood that the number of intent filters is not limited to the three depicted and, as such, a different number of intent filters can be used in alternative embodiments of the present technology.

Embodiments of the present technology, as part of generating the SERP 606, allow the object module 440 to process the search results associated with a given search object and to organize the object answers based on the user-search-intent. As will be explained momentarily, depending of whether the user is looking for Madonna as a singer or Madonna as an actress, the object components within the SERP 606 can be arranged in a different order. Alternatively, depending of whether the user is looking for Madonna as a singer or Madonna as an actress, the different object components can be selected for inclusion into the SERP 606.

As such, as part of processing a user search, the server 416 and the object module 440 can determine a user-search-intent associated with the search request submitted by the user using the query interface 102. The user-search-intent can be determined by analyzing the search query submitted by the user. For example, the user may have submitted the search query "Madonna, the singer", indicating a first particular search intent. As another example, the user may have submitted the search query "Madonna, the actress", indicating a second particular search intent. Within these examples, the user-search-intent is expressly evident based on the search query content itself.

In alternative embodiments, the user-search-intent may not be expressly evident from the search query itself—in other words, the search query can be associated with a vague user-search-intent. This is the case, for example, with the search query containing "Madonna" as the search string. Within these embodiments, the server 416 can access logs associated with past search queries associated with the user to determine statistically more likely intent. For example, if the given user has performed statistically more searches (or has selected more search results) associated with Madonna, the singer rather than Madonna, the actresses, the server 416 can determine that the user-search-intents is "Madonna, the singer". Alternatively, if the given user tends to perform searches associated with singers rather than actresses, the server 416 can determine that the user-search-intents is "Madonna, the singer". In yet additional embodiments, the server 416 can analyze search logs associated with other users to determine, statistically, what is a more likely user-search-intent—"Madonna, the singer" or "Madonna, the actress".

Next, based on the user-search-intent, the server 416 receives, from the object module 440, a set of object information associated with the search query. The set of object information can include different search domains, different linked objects and the like associated with the search object.

In some embodiments of the present technology, the server 416 can select a subset of object information to be included into the SERP 606, the subset of object information being based on the determined user-search-intent. As such, the subset of object information actually included in the SERP 606 in association with the first potential user-search-intent would be different from the subset of object information actually included in the SERP 606 in association with the second potential user-search-intent.

In alternative embodiments of the present technology, the server 416 can select a first subset of object information and a second subset of object information to be included into the SERP 606, the first subset and the second subset of object information being associated with the search object. The server 416 can then organize the first subset of object information and the second subset of object information in a particular order for inclusion into the SERP 606. As such, the order of the first subset of object information and the second subset of object information organized on the SERP 606 in association with the first potential user-search-intent would be different from the order of object information organized on the SERP 606 in association with the second potential user-search-intent.

Figure 8:
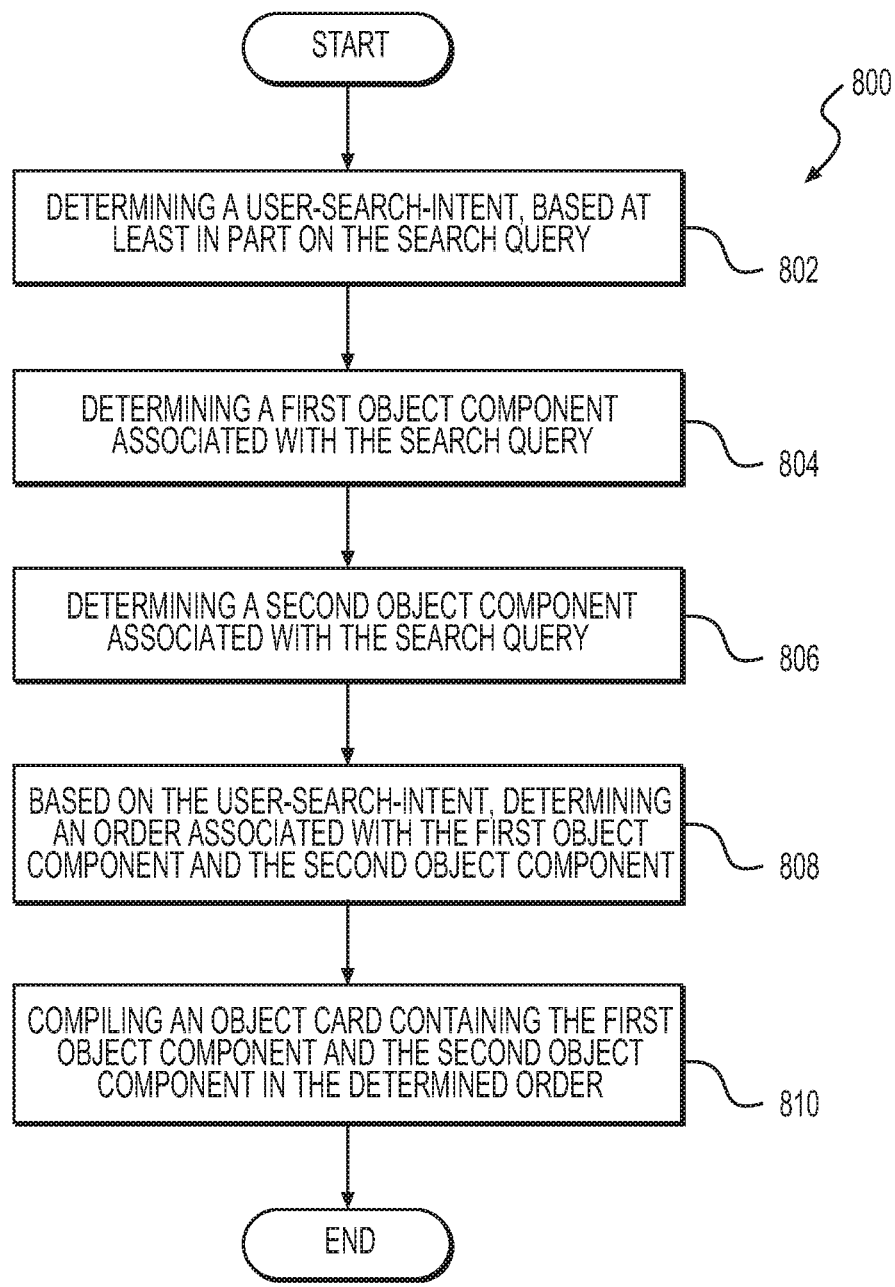
FIG. 8 is a block diagram depicting a flow chat of a method 800, the method 800 being implemented in accordance with non-limiting embodiments of the present technology.

Given the architecture described with reference to FIG. 4 and the example provided above, it is possible to implement a method of processing a search query from a user associated with the electronic device 402 and generating a search result set responsive to the search query. The method can be executable by the server 416 coupled to the electronic device 402 via the communications network 414. FIG. 8 depicts flow chart of a method 800, the method 800 being executed in accordance with a non-limiting embodiment of the present technology.

Step 802—Determining a User-Search-Intent, Based at Least in Part on the Search Query The method 800 starts at step 802, where the server 416 determines a user-search-intent, based at least in part on the search query. Generally speaking, the user-search-intent is representative of what the user conducting the search query is looking for. The user-search-intent can be explicit in the search query (such as, "Madonna latest song") or implicit (such as for the search query "Madonna" the user-search-intent can be based on the most frequent search combination performed by the same user in the past, the most frequent query performed by other users, the most frequent resource selected in response to the search query by the user or other users, and the like).

In some implementations of the present technology, the step of determining 802 comprises determining the user-search-intent based on the search query and at least one search result, other than the first object component and the second object component, the at least one search result also being responsive to the search query.

In some implementations of the present technology, the step of determining 802 comprises determining the user-search-intent based on the search query and a heading associated with one of the first object component and the second object component.

In some implementations of the present technology, the step of determining 802 comprises determining the user-search-intent based on the search query and past SERP interactions between other users and SERPs that were generated in response to past queries similar to the search query.

Step 804—Determining a First Object Component Associated with the Search Query Next, at step 804, the server 416 determines a first object component associated with the search query.

In some embodiments, as part of executing the step of determining 804 a first search object component associated with the search query, the server 416 organizes the first search object component based on at least one vertical search result provided by the vertical search module 422. For example, the server 416 can generate sub-components of the search object component and organize them in order, based on the search results provided by the vertical search module 422.

Just as an example, the first search result 634 is an example of the search object component that has been selected as associated with the search object and that has been organized using vertical search results from "BIOG-RAPHY" vertical search executed by the vertical search module 422. It should be noted that the term "organized" is not particularly limited and may include: selecting sub-components for inclusion into the first search result 634, selecting an order of sub-components, selecting visual placement or emphasis of certain sub-components and the like.

Step 806—Determining a Second Object Component Associated with the Search Query Next, at step 806, the server 416 determines a second object component associated with the search query.

In some embodiments, as part of executing the step of determining 806 a second search object component associated with the search query, the server 416 organizes the second search object component based on at least one vertical search result provided by the vertical search module 422. For example, the server 416 can generate sub-components of the search object component and organize them in order, based on the search result provided by vertical search module 422.

Just as an example, the first search result 634 is an example of the search object component that has been selected as associated with the search object and that has been organized using vertical search results from "BIOG-RAPHY" vertical search executed by the vertical search module 422. It should be noted that the term "organized" is not particularly limited and may include: selecting sub-components for inclusion into the first search result 634, selecting an order of sub-components, selecting visual placement or emphasis of certain sub-components and the like.

In some embodiments of the present technology, the method 800 optionally comprises determining if the search query is susceptible of being answered by object information. Within these embodiments, the step of determining 804 a first object component associated with the search query and the step of determining 806 a second object component associated with the search query are executed in response to the step of determining if the search query is susceptible of being answered by object information rendering a positive outcome Step 808—Based on the User-Search-Intent, Determining an Order Associated with the First Object Component and the Second Object Component At step 808, the server 416, based on the user-search-intent, determines an order associated with the first object component and the second object component.

The order is not limited—as such, the order can include vertical placement above one another, a horizontal placement before one another and the like.

Step 810—Compiling an Object Card Containing the First Object Component and the Second Object Component in the Determined Order At step 810, the server 416 compiles an object card containing the first object component and the second object component in the determined order.

In some implementations of the present technology, the step of compiling 812 further includes providing the object badge 620. In some embodiments, the object badge 620 is located above the first object component and the second object component having been organized in the order determined in step 808. The object badge 620 can be generated based on information available from vertical searches performed by the vertical search module 422, information available from the first resource A 430, the second resource B 432 or a combination thereof.

Figure 9:
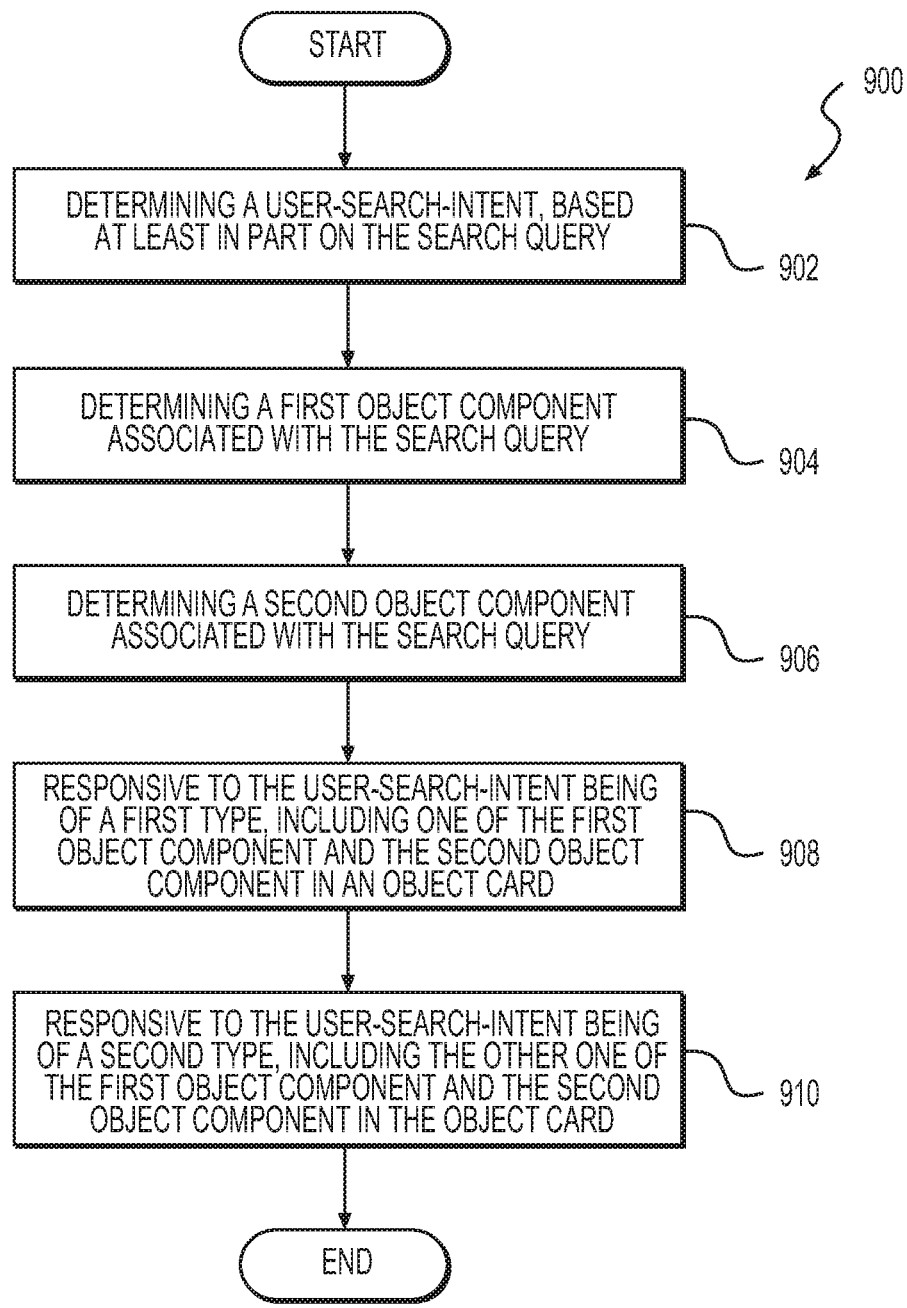
FIG. 9 is a block diagram depicting a flow chat of a method 900, the method 900 being implemented in accordance with other non-limiting embodiments of the present technology.

Given the architecture described with reference to FIG. 4 and the example provided above, it is possible to implement a method of processing a search query from a user associated with the electronic device 402 and generating a search result set responsive to the search query. The method can be executable by the server 416 coupled to the electronic device 402 via the communications network 414. FIG. 9 depicts flow chart of a method 900, the method 900 being executed in accordance with another non-limiting embodiment of the present technology.

Step 902—Determining a User-Search-Intent, Based at Least in Part on the Search Query The method 900 begins at step 902, where the server 416 determines a user-search-intent, based at least in part on the search query. Generally speaking, the user-search-intent is representative of what the user conducting the search query is looking for. The user-search-intent can be explicit in the search query (such as, "Madonna latest song") or implicit (such as for the search query "Madonna" the user-search-intent can be based on the most frequent search combination performed by the same user in the past, the most frequent query performed by other users, the most frequent resource selected in response to the search query by the user or other users, and the like).

In some implementations of the present technology, the step of determining 902 comprises determining the usersearch-intent based on the search query and at least one search result, other than the first object component and the second object component, the at least one search result also being responsive to the search query.

In some implementations of the present technology, the step of determining 902 comprises determining the user-search-intent based on the search query and a heading associated with one of the first object component and the second object component.

In some implementations of the present technology, the step of determining 902 comprises determining the user-search-intent based on the search query and past SERP interactions between other users and SERPs that were generated in response to past queries similar to the search query.

Step 904—Determining a First Object Component Associated with the Search Query

Next, at step 904, the server 416 determines a first object component associated with the search query.

In some embodiments, as part of executing the step of determining 904 a first search object component associated with the search query, the server 416 organizes the first search object component based on at least one vertical search result provided by the vertical search module 422. For example, the server 416 can generate sub-components of the search object component and organize them in order, based on the search result provided by vertical search module 422.

Just as an example, the first search result 634 is an example of the search object component that has been selected as associated with the search object and that has been organized using vertical search results from "BIOGRAPHY" vertical search executed by the vertical search module 422.

Step 906—Determining a Second Object Component Associated with the Search Query

Next, at step 906, the server 416 determines a second object component associated with the search query.

In some embodiments, as part of executing the step of determining 906 a second search object component associated with the search query, the server 416 organizes the second search object component based on at least one vertical search result provided by the vertical search module 422. For example, the server 416 can generate sub-components of the search object component and organize them in order, based on the search result provided by vertical search module 422.

Just as an example, the first search result 634 is an example of the search object component that has been selected as associated with the search object and that has been organized using vertical search results from "BIOGRAPHY" vertical search executed by the vertical search module 422. It should be noted that the term "organized" is not particularly limited and may include: selecting sub-components for inclusion into the first search result 634, selecting an order of sub-components, selecting visual placement or emphasis of certain sub-components and the like.

Step 908—Responsive to the User-Search-Intent being of a First Type, Including One of the First Object Component and the Second Object Component in an Object Card At step 908, the server 416, responsive to the user-search-intent being of a first type, the server 416 includes one of the first object component and the second object component in an object card.

Step 910—Responsive to the User-Search-Intent being of a Second Type, Including the Other One of the First Object Component and the Second Object Component in the Object Card At step 910, responsive to the user-search-intent being of a second type, the server 416 includes the other one of the first object component and the second object component in the object card.

In some implementations of the present technology, the method 900 further includes providing the object badge 620. In some embodiments, the object badge 620 is located above the respective one of the first object component and the second object component. The object badge 620 can be generated based on information available from vertical searches performed by the vertical search module 422, information available from the first resource A 430, the second resource B 432 or a combination thereof.

Figure 10:
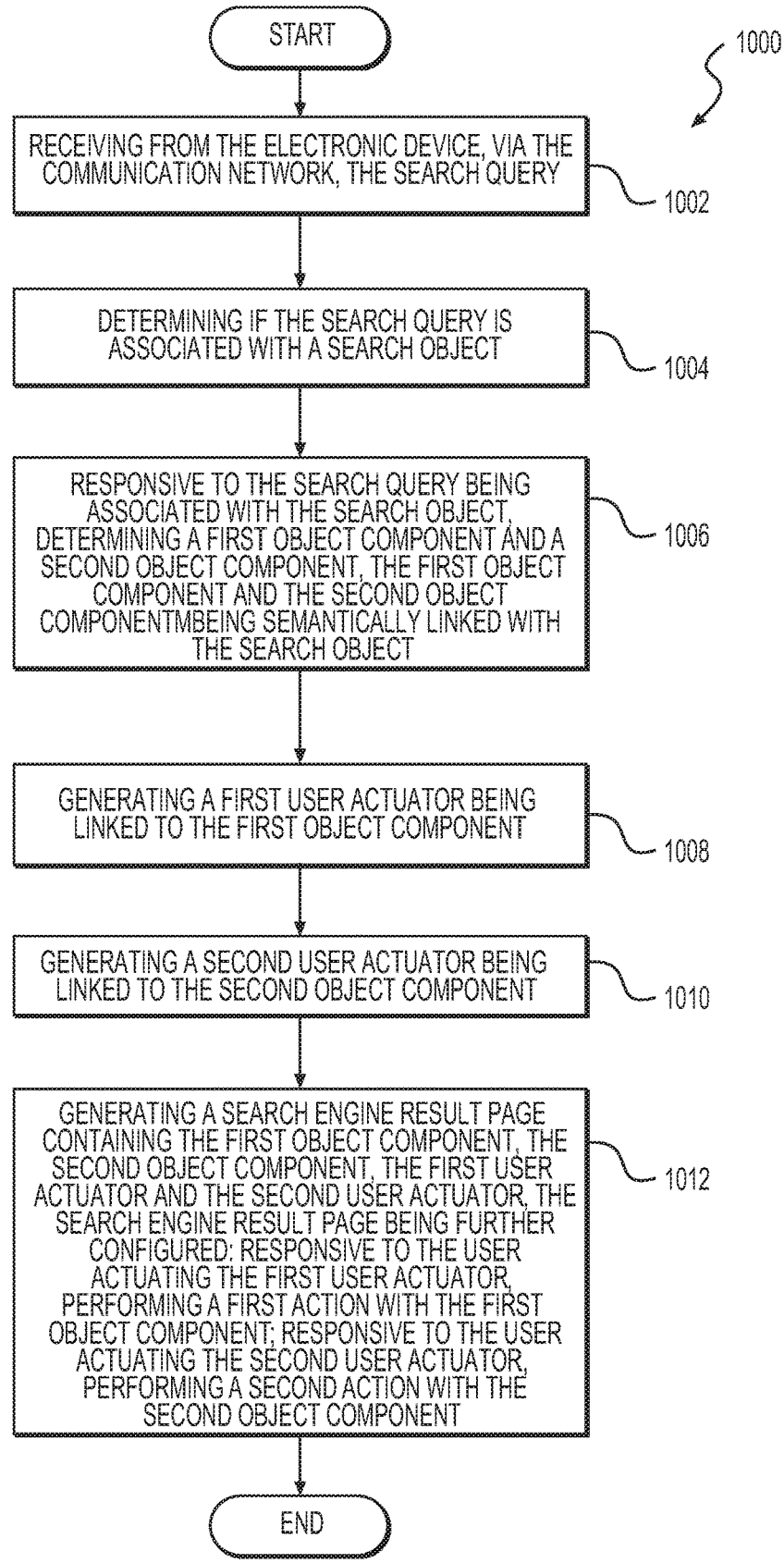
FIG. 10 is a block diagram depicting a flow chat of a method 1000, the method 1000 being implemented in accordance with yet further non-limiting embodiments of the present technology.

Given the architecture described with reference to FIG. 4 and the example provided above, it is possible to implement a method of processing a search query from a user associated with the electronic device 402 and generating a search result set responsive to the search query. The method can be executable by the server 416 coupled to the electronic device 402 via the communications network 414. FIG. 10 depicts flow chart of a method 1000, the method 1000 being executed in accordance with another non-limiting embodiment of the present technology.

Step 1002—Receiving from the Electronic Device, Via the Communication Network, the Search Query The method 1000 begins at step 1002, where the server 416 receives from the electronic device 402, via the communication network 414, the search query.

Step 1002 can be executed in response to the user entering a search query using the query interface 102 of the electronic device 402.

Step 1004—Determining if the Search Query is Associated with a Search Object

Next, at step 1004, the server 416 determines if the search query is associated with a search object.

In some embodiments, to determine if the search object is associated with the search query, the server 416 send a request to the object module 440, so that the search module 440 can check if the table 502 maintains an indication of the search object that is responsive to the search query received in step 1002.

Step 1006—Responsive to the Search Query being Associated with the Search Object, Determining a First Object Component and a Second Object Component, the First Object Component and the Second Object Component being Semantically Linked with the Search Object At step 1006, the server 416, responsive to the search query being associated with the search object, determines a first object component and a second object component, the first object component and the second object component being semantically linked with the search object.

Step 1008—Generating a First User Actuator being Linked to the First Object Component At step 1008, the server 416 generates a first user actuator being linked to the first object component.

In some embodiments of the method 1000, the first object component is associated with a first search intent. Within these implementations, the first user actuator is indicative of the first search intent.

Alternatively, the first object component can be associated with a first object title and the first user actuator can be indicative of the first object title.

Step 1010—Generating a Second User Actuator being Linked to the Second Object Component At step 1010, the server 416 generates a second user actuator being linked to the second object component.

In some embodiments of the method 1000, the second object component is associated with a second search intent. Within these implementations, the second user actuator is indicative of the second search intent.

Alternatively, the second object component can be associated with a second object title and the second user actuator can be indicative of the second object title.

Step 1012—Generating a Search Engine Result Page Containing the First Object Component, the Second Object Component, the First User Actuator and the Second User Actuator, the Search Engine Result Page being Configured: Responsive to the User Actuating the First User Actuator, Performing a First Action with the First Object Component; Responsive to the User Actuating the Second User Actuator, Performing a Second Action with the Second Object Component Next, at step 1012, the server 416 generates a search engine result page containing the first object component, the second object component, the first user actuator and the second user actuator, the search engine result page being configured: responsive to the user actuating the first user actuator, performing a first action with the first object component; responsive to the user actuating the second user actuator, performing a second action with the second object component.

In some embodiments the first action comprises one of: highlighting the first object component; augmenting the first object component; removing the second object component from the search engine result page; changing the order of the first object component relative to the second object component. Just as an example, augmenting the first object component comprises inserting a best-matching result from a general search into the first object component.

In some embodiments, the second action comprises one of: highlighting the second object component; augmenting the second object component; removing the first object component from the search engine result page; changing the order of the second object component relative to the first object component. Just as an example, the augmenting the second object component comprises inserting a best-matching result from a general search into the second object component.

In some embodiments of the method 1000, the second action is different from the first action executed in response to the user actuating the respective first and second user actuators.

In some implementations of the method 1000, the first action and the second action are performed by the electronic device 402 without receiving additional search results from the server 416. In alternative embodiments, the first action and the second action are performed by the electronic device 402 and are based, at least in part, on additional search results received from the server 416. The latter is particularly convenient in those embodiments, where as part of executing the first or the second action, the electronic device 402 augments the respective information presented in association with the first object component and the second object component.

Figure 11:
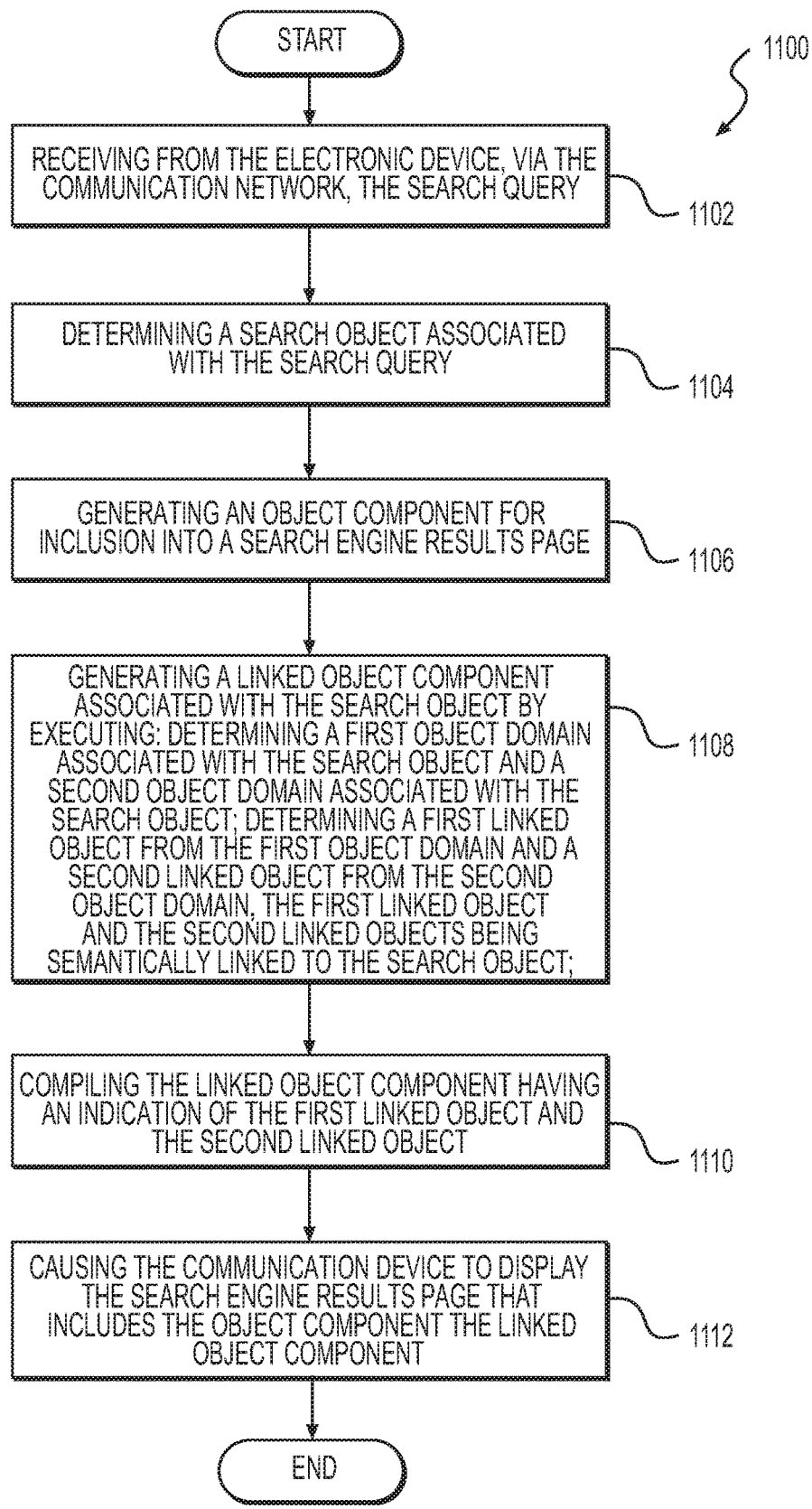
FIG. 11 is a block diagram depicting a flow chat of a method 1100, the method 1100 being implemented in accordance with yet additional non-limiting embodiments of the present technology.

Given the architecture described with reference to FIG. 4 and the example provided above, it is possible to implement a method of processing a search query from a user associated with the electronic device 402 and generating a search result set responsive to the search query. The method can be executable by the server 416 coupled to the electronic device 402 via the communications network 414. FIG. 11 depicts flow chart of a method 1100, the method 1100 being executed in accordance with another non-limiting embodiment of the present technology.

Step 1102—Receiving from the Electronic Device, Via the Communication Network, the Search Query The method 1100 begins at step 1102, where the server 416 receives from the electronic device 402, via the communication network 414, the search query.

Step 1102 can be executed in response to the user entering a search query using the query interface 102 of the electronic device 402.

Step 1104—Determining a Search Object Associated with the Search Query

Next, at step 1104, the server 416 determines a search object associated with the search query.

In some embodiments, to determine if the search object is associated with the search query, the server 416 send a request to the object module 440, so that the search module 440 can check if the table 502 maintains an indication of the search object that is responsive to the search query received in step 1102.

In some embodiments, of the server 416 can not determine the search object associated with the search query, the method 1100 terminates.

Step 1106—Generating an Object Component for Inclusion into a Search Engine Results Page At step 1106, the server 416 generates an object component for inclusion into a search engine results page.

In some embodiments, as part of executing the step of generating 1106 an object component associated with the search query, the server 416 organizes the object component based on at least one vertical search result provided by the vertical search module 422. For example, the server 416 can generate sub-components of the search object component and organize them in order, based on the search result provided by vertical search module 422.

Just as an example, the first search result 634 is an example of the search object component that has been selected as associated with the search object and that has been organized using vertical search results from "BIOGRAPHY" vertical search executed by the vertical search module 422. It should be noted that the term "organized" is not particularly limited and may include: selecting sub-components for inclusion into the first search result 634, selecting an order of sub-components, selecting visual placement or emphasis of certain sub-components and the like.

Step 1108—Generating a Linked Object Component Associated with the Search Object by Executing: Determining a First Object Domain Associated with the Search Object and a Second Object Domain Associated with the Search Object; Determining a First Linked Object from the First Object Domain and a Second Linked Object from the Second Object Domain, the First Linked Object and the Second Linked Objects being Semantically Linked to the Search Object At step 1108, the server 416 generates a linked object component associated with the search object by executing: determining a first object domain associated with the search object and a second object domain associated with the search object; determining a first linked object from the first object domain and a second linked object from the second object domain, the first linked object and the second linked objects being semantically linked to the search object.

In some embodiments of the method 1100, the method 1100 further comprises appreciating the first object domain and the second object domain. In some embodiments, the server 416 can query the object module 440 and the object module 440 can retrieve the indication of the first object domain and the second object domain from the object database 442.

Alternatively, the step of appreciating can include appreciating the first object domain and the second object domain substantially in real-time, i.e. after executing the step of receiving 1102: visiting the first resource A 430 to retrieve an indication of the first object domain; and visiting the second resource B 432 to retrieve an indication of the second object domain.

As has been explained above, in some embodiments, the object module 440 may execute an object merging routine to determine that the first object domain and the second object domain are both associated with the same search object.

Step 1110—Compiling the Linked Object Component Having an Indication of the First Linked Object and the Second Linked Object At step 1110, the server 416 compiles the linked object component having an indication of the first linked object and the second linked object.

As has been previously described, the server 416 can generate the linked objects portion 652.

Step 1112—Causing the Communication Device to Display the Search Engine Results Page that Includes the Object Component and the Linked Object Component At step 1112, the server 416 causes the communication device 402 to display the search engine results page that includes the object component and the linked object component. Essentially, the communication device 402 displays the SERP 606 depicted with reference to FIG. 6.

In some embodiments of the method 1100, the method 1100 further comprises, prior to the step of receiving 1102, associating the first object domain and the second object domain with the search object. This can be done, for example, as part of the above described routine to populate information in table 502 by the object module 440.

Within those embodiments, the server 416 causes the object module 440 to store an indication of an association of the first object domain and the second object domain with the search object in the object database 442 accessible by the server 416 via sending a request to the object module 440 (or directly accessing the object database 442).

In some embodiments of the method 1100, the method 1100 further comprises, prior to executing the step of receiving 1102, associating the first linked object with the first domain and the second linked object with the second domain. This can be executed as part of the above described linked objects determining routine.

In some embodiments of the method 1100, the method 1100 further comprises determining if the first linked object is linked to the search object. This can be done as part of the linked objects determination routine. Broadly speaking, in some embodiments of the method 1100, the linked objects determination routine comprises analyzing a set of properties associated with the first linked object and a set of properties associated with the search object to determine if the first linked object is linked to the search object.

In some embodiments of the method 1100, the method 1100 further comprises, storing an indication of an association of the first linked object with the first domain and the second linked object in the object database 442 accessible by the server 416 via sending a request to the object module 440 (or directly accessing the object database 442).

Figure 12:
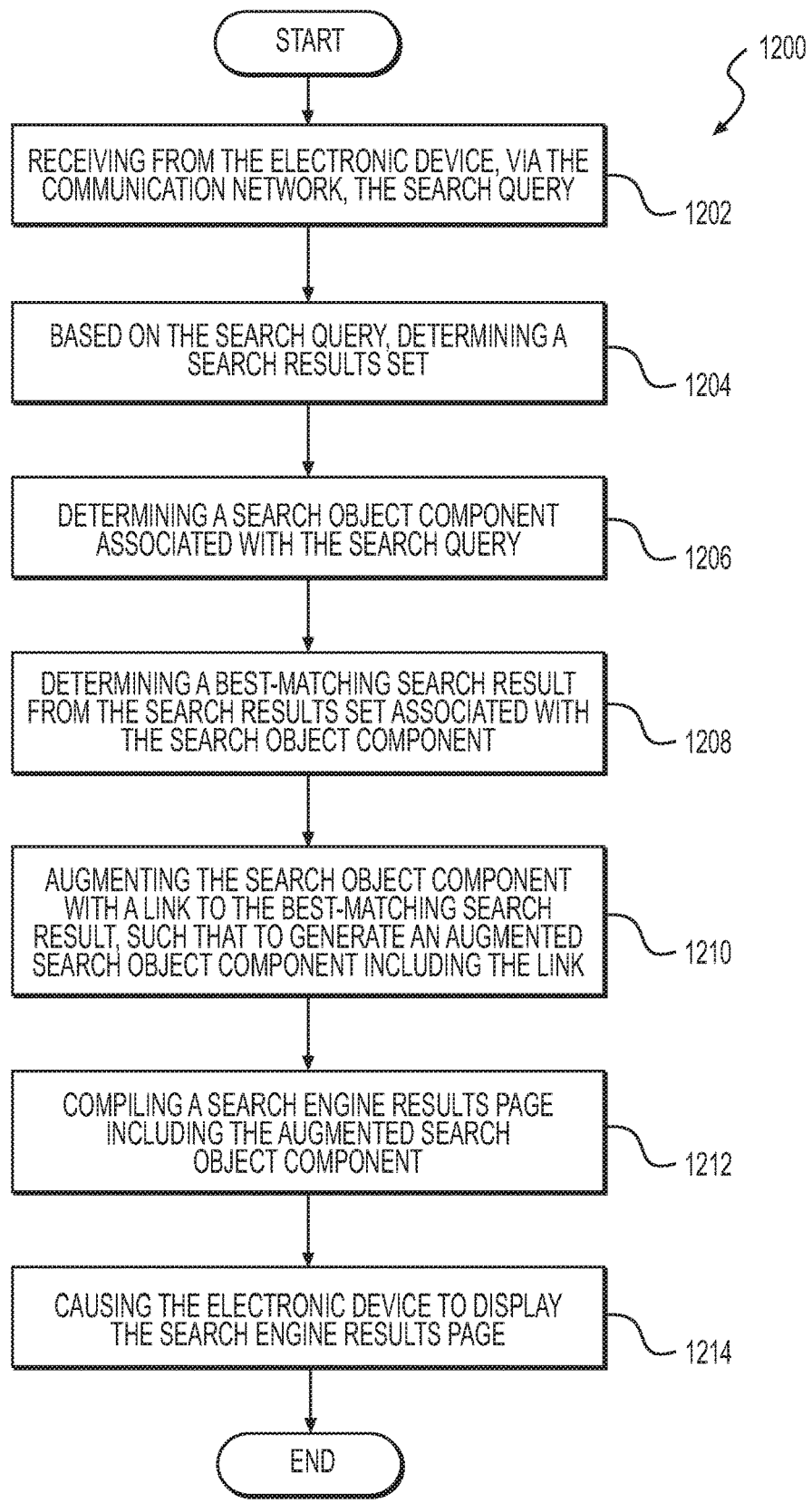
FIG. 12 is a block diagram depicting a flow chat of a method 1200, the method 1200 being implemented in accordance with yet additional non-limiting embodiments of the present technology.

Given the architecture described with reference to FIG. 4 and the example provided above, it is possible to implement a method of processing a search query from a user associated with the electronic device 402 and generating a search result set responsive to the search query. The method can be executable by the server 416 coupled to the electronic device 402 via the communications network 414. FIG. 12 depicts flow chart of a method 1200, the method 1200 being executed in accordance with another non-limiting embodiment of the present technology.

Step 1202—Receiving from the Electronic Device, Via the Communication Network, the Search Query The method 1200 begins at step 1202, where the server 416 receives from the electronic device 402, via the communication network 414, the search query.

Step 1202 can be executed in response to the user entering a search query using the query interface 102 of the electronic device 402.

Step 1204—Based on the Search Query, Determining a Search Results Set

Next, at step 1204, the server 416, based on the search query, determining a search results set.

In some embodiments of the present technology, the step of determining the search result set comprises running the searches using the search cluster 418, as has been discussed above. It should be noted that the search results set can include both the search results from the web search module 420 and the vertical search module 422.

Step 1206—Determining a Search Object Component Associated with the Search Query At step 1206, the server 416 determines a search object component associated with the search query.

In some embodiments, as part of executing the step of determining 1206 a search object component associated with the search query, the server 416 organizes the search object component based on at least one vertical search result provided by the vertical search module 422. For example, the server 416 can generate sub-components of the search object component and organize them in order, based on the search result provided by vertical search module 422.

Just as an example, the first search result 634 is an example of the search object component that has been selected as associated with the search object and that has been organized using vertical search results from "BIOGRAPHY" vertical search executed by the vertical search module 422. It should be noted that the term "organized" is not particularly limited and may include: selecting sub-components for inclusion into the first search result 634, selecting an order of sub-components, selecting visual placement or emphasis of certain sub-components and the like.

Step 1208—Determining a Best-Matching Search Result from the Search Results Set Associated with the Search Object Component At step 1208, the server 416 determines a best-matching search result from the search results set associated with the search object component.

In some embodiments of the present technology, to determine the best-matching result, the server 416 retrieves the top-matching result from a general web search provided by the web search module 420. In some embodiments, the server 416 retrieves more than the top search results, such as the top two results, the top three results and the like.

Step 1210—Augmenting the Search Object Component with a Link to the Best-Matching Search Result, Such that to Generate an Augmented Search Object Component Including the Link At step 1210, the server 416 augments the search object component with a link to the best-matching search result, such that to generate an augmented search object component including the link.

Step 1212—Compiling a Search Engine Results Page Including the Augmented Search Object Component At step 1212, the server 416 compiles a search engine results page including the augmented search object component.

Step 1214—Causing the Electronic Device to Display the Search Engine Results Page At step 1214, the server 416 causes the electronic device 402 to display the search engine results page.

In some embodiments of the present technology, the step of augmenting 1210 is executed automatically. In alternative embodiments of the present technology, the step of augmenting 1210 is executed in response to the user providing a positive indication to augment the search engine results page with the best-matching search result (for example, clicking a button or any other suitable actuator on the screen of the electronic device 402).

Within the latter implementations, the step of causing 1214 the electronic device 402 to display the search engine results page comprises: (i) first displaying an un-augmented version of the search engine results page including the search object component; and (ii) responsive to the user providing the positive indication to augment, displaying an augmented version of the search engine results page including the augmented search object component.

Even though the forgoing description has been presented using singers as "search objects", embodiments of the present technology are not so-limited. As such, within alternative embodiments of the present technology, a "search object" can be any type of animate or inanimate object that is susceptible of being a search objects for a given user. Non-limiting and non-exhaustive examples of objects includes: people, monuments, places of interest, animals, and the like. Some examples of search queries being directed to objects searches would include: "bridges of Spain", "British politicians", "Madonna", "Pele", "Toronto city hall", "paella", "BMW" and the like.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method of processing a search query comprising one or more words from a user associated with an electronic device, the method executable at a search server configured to be coupled to:
   the electronic device via a communication network;
   a crawler application;
   a search cluster configured to execute a general web search and at least one vertical search;
   an object database, the object database comprising:
     a search object;
     a first object domain associated with the search object, the first object domain being associated with:
       a first linked object semantically linked to the search object;
       a second linked object semantically linked to the search object;
     a second object domain associated with the search object, the second object domain being associated with a third linked object semantically linked to the search object;
   the first linked object, the second linked object, and the third linked object having been retrieved by the crawler application;
the method comprising:
   receiving from the electronic device, via the communication network, the search query;
   generating, in response to receiving the search query, a search result set for transmission thereof to the electronic device;
   identifying, in the search result set, a top search result associated with the search query using the search cluster;
   accessing the object database to determine if the search query as a whole corresponds to the search object;
   in response to the search query corresponding to the search object, generating a plurality of object components for inclusion thereof into an object card portion defined within a search engine results page, each of the plurality of object components having been pre-associated with a respective plurality of search results in the set of search results, wherein:
     a first object component has been pre-associated with a first plurality of search results, the first plurality of search results including general web search results associated with the search object, and
     a second object component has been pre-associated with a second plurality of search results, the second plurality of search results including vertical search results associated with the search object;
   determining, based on the first object component, a first user intent;
   determining, based on the second object component, a second user intent;
   generating a first intent filter linked to the first user intent;
   generating a second intent filter linked to the second user intent;
   generating a linked object component associated with the search object by executing:
     ranking the first object domain and the second object domain based at least on a correlation of the first object domain and the second object domain to the top search result;
     generating a first user actuator linked to the first object domain;
     generating a second user actuator linked to the second object domain;
     in response to the first object domain being ranked above the second object domain, compiling the linked object component having an indication of the first linked object, the second linked object, and the third linked object, thereby forming an initial ranked order;
   transmitting the set of search results and information for compiling the search engine results page to the electronic device, the transmitting further comprising causing the electronic device to execute:

displaying the search engine results page that includes the object card portion and the linked object component, where the object card portion further includes the plurality of object components, the first intent filter, and the second intent filter, wherein:

the first object component is displayed to include at least one general web search result from the first plurality of search results; and the second object component is displayed to include at least one vertical search result from the second plurality of search results;

the linked object component is displayed in a linked object portion of the search engine result page, the linked object component comprising the first linked object, the second linked object and the third linked object in the initial ranked order, and the first user actuator and the second user actuator; and in response to the user actuating the first user actuator, displaying the first linked object and the second linked object without displaying the third linked object;

in response to the user actuating the second user actuator, displaying the third linked object without displaying the first linked object and the second linked object;

in response to the user actuating the first intent filter, executing, without sending additional search queries to the server:

retrieving, from the first plurality of search results, at least one additional general web search result, inserting, in the object card portion of the search engine result page, the at least one additional general web search result into the first search object component;

displaying, in the object card portion of the search engine results page, the first object component to include the at least one general web search result and the at least one additional general web search result, thereby augmenting the first object component; and removing, from the object card portion of the search engine results page, the second object component;

in response to the user actuating the second intent filter, executing, without sending additional search queries to the server:

retrieving, from the second plurality of search results, at least one additional vertical search result, inserting, in the object card portion of the search engine result page, the at least one additional vertical search result into the second object component;

displaying, in the object card portion of the search engine results page, the second object component to include the at least one vertical search result and the at least one additional vertical search result, thereby augmenting the second object component; and removing, from the object card portion of the search engine results page, the first object component.

2. The method of claim 1, the method further comprising, prior to said receiving, associating the first object domain and the second object domain with the search object.

3. The method of claim 2, further comprising storing an indication of an association of the first object domain and the second object domain with the search object in a database accessible by the server.

4. The method of claim 2, further comprising appreciating the first object domain and the second object domain, wherein said appreciating comprises:

visiting a first resource to retrieve an indication of the first object domain; and visiting a second resource to retrieve an indication of the second object domain.

5. The method of claim 4, wherein the first resource and the second resource are associated with a same resource domain.

6. The method of claim 4, further comprising executing an object merging routine to determine that the first domain and the second domain are both associated with the same search object.

7. The method of claim 2, further comprising storing an indication of an association of the first linked object with the first domain and the second linked object with the second domain in a database accessible by the server.

8. The method of claim 1, further comprising determining if the first linked object is linked to the search object.

9. The method of claim 8, wherein said determining comprising analyzing a set of properties associated with the first linked object and a set of properties associated with the search object to determine if the first linked object is linked to the search object.

10. The method of claim 9, wherein said set of properties respectively associated with the search object and the first linked object is indicative of a degree of certainty that the first linked object is linked to the search object.

11. The method of claim 8, wherein said determining further comprises analyzing search engine queries where the search object and the first linked object are searched together.

12. A server configured to be coupled to:

a crawler application;

a search cluster configured to execute a general web search and at least one vertical search;

an object database, the object database comprising:

a search object;

a first object domain associated with the search object, the first object domain being associated with:

a first linked object semantically linked to the search object;

a second linked object semantically linked to the search object;

a second object domain associated with the search object, the second object domain being associated with a third linked object semantically linked to the search object;

the first linked object, the second linked object, and the third linked object having been retrieved by the crawler application;

the server comprising:

a communication interface for communication with an electronic device via a communication network, a processor operationally connected with the communication interface, the processor being configured to:

receive, via the communication network, from a user of the electronic device, a search query;

generate, in response to receiving the search query, a search result set for transmission thereof to the electronic device;

identify, in the search result set, a top search result associated with the search query using the search cluster;

access the object database to determine if the search query as a whole corresponds to the search object;

in response to the search query corresponding to the search object, generate a plurality of object components for inclusion thereof into an object card portion defined within a search engine results page, each of the plurality of object components having been pre-associated with a respective plurality of search results in the set of search results, wherein:
  a first object component has been pre-associated with a first plurality of search results, the first plurality of search results including general web search results associated with the search object, and
  a second object component has been pre-associated with a second plurality of search results, the second plurality of search results including vertical search results associated with the search object;

determine, based on the first object component, a first user intent;

determine, based on the second object component, a second user intent;

generate a first intent filter linked to the first user intent;

generate a second intent filter linked to the second user intent;

generate a linked object component associated with the search object by executing:
  ranking the first object domain and the second object domain based at least on a correlation of the first object domain and the second object domain to the top search result;
  generating a first user actuator linked to the first object domain;
  generating a second user actuator linked to the second object domain;
  in response to the first object domain being ranked above the second object domain, compiling the linked object component having an indication of the first linked object, the second linked object, and the third linked object, thereby forming an initial ranked order;
  transmitting the set of search results and information for compiling the search engine results page to the electronic device, the transmitting further comprising causing the electronic device to execute:
    displaying the search engine results page that includes the object card portion and the linked object component, where
      the object card portion further includes the plurality of object components, the first intent filter, and the second intent filter, wherein:
        the first object component is displayed to include at least one general web search result from the first plurality of search results; and
        the second object component is displayed to include at least one vertical search result from the second plurality of search results;
      the linked object component is displayed in a linked object portion of the search engine result page, the linked object component comprising the first linked object, the second linked object and the third linked object in the initial ranked order, and the first user actuator and the second user actuator; and
    in response to the user actuating the first user actuator, displaying the first linked object and the second linked object without displaying the third linked object;
    in response to the user actuating the second user actuator, displaying the third linked object without displaying the first linked object and the second linked object;
    in response to the user actuating the first intent filter, executing, without sending additional search queries to the server:
      retrieving, from the first plurality of search results, at least one additional general web search result,
      inserting, in the object card portion of the search engine result page, the at least one additional general web search result into the first search object component;
      displaying, in the object card portion of the search engine results page, the first object component to include the at least one general web search result and the at least one additional general web search result, thereby augmenting the first object component; and
      removing, from the object card portion of the search engine results page, the second object component;
    in response to the user actuating the second intent filter, executing, without sending additional search queries to the server:
      retrieving, from the second plurality of search results, at least one additional vertical search result,
      inserting, in the object card portion of the search engine result page, the at least one additional vertical search result into the second object component;
      displaying, in the object card portion of the search engine results page, the second object component to include the at least one vertical search result and the at least one additional vertical search result, thereby augmenting the second object component; and
      removing, from the object card portion of the search engine results page, the first object component.

13. The server of claim 12, the processor being further operable to, prior to a point of time when it receives the search request, associate the first object domain and the second object domain with the search object.

14. The server of claim 13, the processor being further operable to store an indication of an association of the first object domain and the second object domain with the search object in a database accessible by the server.

15. The server of claim 13, the processor being further operable to appreciate the first object domain and the second object domain, wherein to appreciate, the processor is configured to:
  visit a first resource to retrieve an indication of the first object domain; and visit a second resource to retrieve an indication of the second object domain.

16. The server of claim 15, wherein the first resource and the second resource are associated with a same resource domain.

17. The server of claim 15, the processor being further operable to execute an object merging routine to determine that the first domain and the second domain are both associated with the same search object.

18. The server of claim 12, the processor being further operable to determine if the first linked object is linked to the search object by analyzing a set of properties associated with the first linked object and a set of properties associated with the search object.

* * * * *